US012487243B2

(12) United States Patent
Poynard et al.

(10) Patent No.: US 12,487,243 B2
(45) Date of Patent: Dec. 2, 2025

(54) METHOD OF DIAGNOSIS OF INFECTION BY THE SARS-CoV-2 VIRUS

(71) Applicants: BIOPREDICTIVE, Paris (FR); ASSISTANCE PUBLIQUE—HÔPITAUX DE PARIS, Paris (FR)

(72) Inventors: Thierry Poynard, Paris (FR); Patrice Cacoub, Nogent sur Marne (FR); Olivier Deckmyn, Cabries (FR)

(73) Assignees: BIOPREDICTIVE, Paris (FR); ASSISTANCE PUBLIQUE-HÔPITAUX DE PARIS, Paris (FR)

( * ) Notice: Subject to any disclaimer, the term of this patent is extended or adjusted under 35 U.S.C. 154(b) by 562 days.

(21) Appl. No.: 17/999,922

(22) PCT Filed: May 26, 2021

(86) PCT No.: PCT/EP2021/064034
§ 371 (c)(1),
(2) Date: Nov. 27, 2022

(87) PCT Pub. No.: WO2021/239803
PCT Pub. Date: Dec. 2, 2021

(65) Prior Publication Data
US 2023/0236197 A1 Jul. 27, 2023

(30) Foreign Application Priority Data

May 27, 2020 (EP) .................................... 20305553
Dec. 21, 2020 (EP) .................................... 20306650

(51) Int. Cl.
*G01N 33/68* (2006.01)
*A61K 45/06* (2006.01)

(52) U.S. Cl.
CPC ......... *G01N 33/6827* (2013.01); *A61K 45/06* (2013.01); *G01N 33/6893* (2013.01)

(58) Field of Classification Search
CPC ............. A61K 45/06; G01N 2333/165; G01N 33/56983; G01N 33/6827; G01N 33/6893
See application file for complete search history.

(56) References Cited

U.S. PATENT DOCUMENTS

2004/0039553 A1* 2/2004 Poynard ............. G01N 33/6893
702/190
2016/0041153 A1* 2/2016 Brown ............... G01N 33/5308
436/501

OTHER PUBLICATIONS

International Search Report and Written Opinion issued Aug. 11, 2021 for corresponding PCT Application No. PCT/EP2021/064034.
Yayun Yang et al., "Abstract", 2020, pp. 1-20 XP055743006.
Yayun Yang et al., "Low serum apolipoprotein A 1 is an indicator of severity in patients with coronavirus disease 2019," Reasearch Square, 2020, pp. 1-20.

(Continued)

*Primary Examiner* — Jennifer Wecker
(74) *Attorney, Agent, or Firm* — POLSINELLI PC

(57) ABSTRACT

The invention relates to a new non-invasive test making it possible to detect infection by the SARS-CoV-2 virus in a patient, using values of Apolipoprotein A1 alone or in combination with other markers.

5 Claims, 8 Drawing Sheets

A.

B.

(56) References Cited

OTHER PUBLICATIONS

Xiaoling Xu et al., "Effective treatment of severe COVID-19 patients with tocilizumab", Proceedings of The National Academy of Sciences, vol. 117, No. 20, 2020, pp. 10970-10975 XP055740697.

Laure Wynants et al., "Readers'note", BMJ, vol. m1328, 2020, pp. 1-24 XP055737700.

Thierry Poynard et al., "Performance of serum apolipoprotein-A1 as a sentinel of Covid-19", PLOS One, 2020, pp. 1-38 XP055743004.

Thierry Poynard et al., "Performance of serum apolipoprotein-A1 as a sentinel of Covid-19", medRxiv, 2020, pp. 1-28.

Anonymous: "Apolipoprotein A," University of Rochester, 2021, pp. 1-4.

Anonymous: "Test Definition:APOA1," Mayo Clinic Laboratories, pp. 1-4.

Christoph B. Messner et al., "Clinical classifiers of COVID-19 infection from novel ultra-high-throughput proteomics", medRxiv, 2020, pp. 1-35 XP055743167.

George Lau et al., "Clinical practice guidance for hepatology and liver transplant providers during the COVID-19 pandemic: APASL expert panel consensus recommendations", Hepatology International, vol. 14, No. 4, 2020, pp. 415-428 XP037194799.

James R. Hilser et al., "Association of serum HDL-cholesterol and apolipoprotein A1 levels with risk of severe SARS-CoV-2 infection," JLR Patient-Oriented and Epidemiological Research, vol. 62, 2021, pp. 1-11.

Thibault Fiolet et al., "Effect of hydroxychloroquine with or without azithromycin on the mortality of coronavirus disease 2019 (COVID-19) patients: a systematic review and meta-analysis", Clinical Microbiology and Infection, 2020, pp. 1-9 XP055743077.

Anonymous: "Tools to Support New Coronavirus Research", 2020, pp. 1-36 XP055743236.

Julien Andreani et al., "In vitro testing of combined hydroxychloroquine and azithromycin on SARS-CoV-2 shows synergistic effect", Microbial Pathogenesis, Academic Press Limited, vol. 145, 2020, pp. 1-4 XP086183213.

\* cited by examiner

METHOD OF DIAGNOSIS OF INFECTION BY THE SARS-CoV-2 VIRUS

CROSS-REFERENCE TO RELATED APPLICATIONS

This application is a national stage application (under 35 U.S.C. § 371) of PCT/EP2021/064034, filed May 26, 2021, which claims benefit of European Application No. 20305553.8, filed May 27, 2020, and European Application No. 20306650.1, filed Dec. 21, 2020, which are incorporated herein by reference in their entireties.

The invention relates to a new non-invasive test making it possible to detect infection by the SARS-CoV-2 virus in a patient.

Coronavirus disease 2019 (COVID-19) is an infectious disease caused by severe acute respiratory syndrome coronavirus 2 (SARS-CoV-2). The disease was first identified in 2019 in Wuhan (China) and has quickly spread globally.

Common symptoms generally include fever, cough, and shortness of breath. While most people have little symptoms, in some cases, COVID-19 may affect the lungs causing pneumonia. In those most severely affected, COVID-19 may rapidly progress to acute respiratory distress syndrome (ARDS) causing respiratory failure, septic shock, or multi-organ failure. Such failure may result from a cytokine storm, when large numbers of white blood cells are activated and release inflammatory cytokines, which in turn activate yet more white blood cells. The result is an immune response that becomes ubiquitous and not focused on infected cells.

There are currently a few treatments that are investigated to treat COVID-19 patients. Hydroxychloroquine, alone or in combination with azithromycin, seem to have an antiviral effect for patients when treated early. Other antiviral drugs (remdesivir or lopinavir/ritonavir) may also be useful.

When patients have acute respiratory distress syndrome, it is often noticed that the viral charge has diminished. Using anti-inflammatory drugs (such as corticoids, for example methylprednisolone, or anti-IL6 or anti-IL6 receptor drugs) can make it possible to control the cytokine storm. Hydroxychloroquine may also be useful for treating cytokine storm (Yao et al, Clin Infect Dis. 2020 Mar. 9. pii: ciaa237. doi: 10.1093/cid/ciaa237).

When faced with a patient with a suspicion of infection by the SARS-CoV-2 virus it is important to confirm such diagnosis. It is possible to perform a RT-PCR on a nasal sample from the patient. However, such test is not always accurate, as giving many false-negative results.

There is thus a need for a novel and rapid test to identify SARS-CoV-2 positive patients, with good specificity and sensitivity. Such test should be applicable specifically in the context of a SARS-CoV-2 epidemic.

There is thus an urgent need for efficient early detection of covid-19 in general population. Viral nucleic acid testing and chest computed tomography are standard methods for diagnosing covid-19 in patients with symptoms but are time consuming. In healthy general population, several predictors were identified such as age, sex, previous hospital admissions, comorbidity data, and social determinants of health. A recent review suggests that the proposed models are at high risk of bias, and that their predictive performance when used in practice is probably lower than that reported (Wynants et al. Prediction models for diagnosis and prognosis of covid-19 infection: systematic review and critical appraisal. BMJ. 2020; 369:m1328).

Yang et al (DOI: 10.21203/rs.3.rs-31251/v1) is a preprint of a scientific article. It availability date remains elusive. Indeed, use of the DOI code links to the research square web site (https://www.researchsquare.com/article/rs-31251/v1) which indicates a posting date of May 29, 2020. Another site indicates a posting date of Jun. 8, 2020 (https://europepmc.org/article/ppr/ppr172974). This document is essentially based on patients already diagnosed with Covid-19 and indicates that low serum level of apolipoprotein A1 is an indicator of severity. One can actually note that the level of ApoA1 upon admission is 1.2 [1.09-1.31] which is about the normal level.

Messner et al (DOI: 10.1101/2020.04.27.20081810) discloses biomarkers that distinguish mild and severe forms of COVID-19. This analysis was performed using proteomics methods (i.e.). 27 of such markers have been identified, as being differentially expressed between the different forms of the disease. As for document Yang, this document is essentially based on patients already diagnosed with Covid-19 and grades the severity of the disease, noting that apolipoprotein A1 levels (in the proteomics test) is lowered for patients with a severe disease.

Using an approach not restricted to patients with an established COVID-19 disease, the present application has demonstrated that low serum level of ApoA1 is an actual sentinel marker of the presence of infection, which can be used very early in a general population. Furthermore, these documents don't describe or suggest the combination of ApoA1 with other markers such as Haptoglobin, alpha-2-macroglobulin (A2M), (gammaglutamyl transpeptidase) GGT, age and sex (gender). Using these further markers can be of use to improve specificity of the diagnosis, in particular in case of significant return to normal for both ApoA1 and haptoglobin. In addition, due to the fact that the analysis was performed on hospitalized patients, the specificity of ApoA1 was not studied in the general population, taking into account the low prevalence of circulation of the virus (and the risk of false-positive) or among patients at risk of being false-positive, such as patients with rheumatological diseases, chronic and acute severe liver diseases. One can also note that the teachings of these documents were not published in peer-reviewed journals, in contrast to the teachings reported in the present application (Poynard et al, PLoS One 2020 Nov. 20; 15(11):e0242306; DOI: 10.1371/journal.pone.0242306). It is also worth mentioning that the decrease of ApoA1 in particular when combined with the increase of Haptoglobin, after adjustment on A2M and GGT (markers of liver injury) is able to be a sensitive and very early marker of SARS-CoV-2 infection.

Lau et al (HEPATOLOGY INTERNATIONAL, SPRINGER INDIA, INDIA, vol. 14, no. 4, 23 May 2020 (2020 May 23), pages 415-428, XP037194799, DOI: 10.1007/S12072-020-10054-W) pertains to the effects of hydroxychloroquine and azithromycine for treating Sars-CoV-2 patients.

This is also the case for Andreani et al (MICROBIAL PATHOGENESIS, ACADEMIC PRESS LIMITED, NEW YORK, NY, US, vol. 145, 25 Apr. 2020 (2020 Apr. 25), DOI: 10.1016/J.MICPATH.2020.104228).

Xu et al (PROCEEDINGS OF THE NATIONAL SCIENCES, vol. 117, no. 20, 29 Apr. 2020 (2020 Apr. 29), 10970-10975, DOI: 10.1073/pnas.2005615117) pertains to the treatment of patients with tocilizumab. ET AL:

Fiolet et al (CLINICAL MICROBIOLOGY AND INFECTION., 1 Aug. 2020 (2020 Aug. 1), DOI: 10.1016/j.cmi.2020.08.022) performs a review of the effect of hydroxychloroquine with or without azithromycin on the mortality of coronavirus disease 2019 (COVID-19) patients.

The inventors propose to use Apolipoprotein-A1 (Apo-A1) as a marker of SARS-CoV-2 infection, alone or in combination with other markers. In the context of a SARS-CoV-2 outbreak, i.e. when the disease is spreading among the population. As shown in the examples, Apolipoprotein-A1 is a very sensitive, specific and early marker of SARS-CoV-2 infection, but may also be linked to specific liver diseases. When used alone, it can be a surrogate marker for PCR (in particular when PCR is negative) and should be used within the complete clinical picture for posing the COVID-19 diagnosis. Hence, in an epidemic context, facing a patient with any of the COVID-19 signs (such as cough, fever, as well as skin rash, ageusia anosmia . . . ), measuring the level (or amount) of Apolipoprotein-A1 in the blood or serum of a patient will help the physician to determine whether such patient is infected with the SARS-CoV-2 virus. Using other markers makes it possible to increase the sensitivity and specificity of the test, in particular by excluding other diseases that are susceptible to modify the amount of Apolipoprotein-A1. The bias mentioned by Wynants et al have been lowered by the use of data from the general population, that made it possible to obtain a robust diagnosis method.

The quality of a diagnosis test is generally determined by drawing a Receiving Operating Characteristic (ROC) curve and measuring the Area Under Receiving Operating Characteristic curve (AUROC). The ROC curve is drawn by plotting the sensitivity versus (1-specificity), after classification of the patients, according to the result obtained for the diagnosis test, for different thresholds (from 0 to 1). It is usually acknowledged that the area under a ROC curve which has a value superior to 0.7 is a good predictive curve for diagnosis. The ROC curve has to be acknowledged as a curve allowing prediction of the quality of a diagnosis test. It is best for the AUROC to be as closed as 1 as possible, this value describing a test which is 100% specific and sensitive.

It is reminded that
(1) sensitivity is the probability that the diagnosis is positive in individuals suffering from the disease sought (detection of true positives): the test is positive if the patient is suffering from the disease. The sensitivity is low when the number of false negatives is high. The sensitivity is calculated by the formula SE=(number of individuals suffering from the disease in whom the sign is present)/(number of individuals suffering from the disease in whom the sign is present+number of individuals suffering from the disease in whom the sign is absent).
(2) specificity is the probability that the diagnosis is negative in the individuals not suffering from the disease sought (non-detection of true negatives): the test is negative if the patient is not suffering from the disease. The specificity is low when the number of false positives is high. The specificity is calculated by the formula SP=(number of individuals not suffering from the disease in whom the sign is absent)/(number of individuals not suffering from the disease in whom the sign is absent+number of individuals not suffering from the disease in whom the sign is present).
(3) Positive predictive value (PPV): is the probability of having the disease if the diagnostic test is positive (i.e. that the patient is not a false positive): the patient is suffering from the disease if the test is positive. The positive predictive value is calculated by the formula PPV=(number of individuals suffering from the disease in whom the sign is present)/(number of individuals suffering from the disease in whom the sign is present+number of individuals not suffering from the disease in whom the sign is present).
(4) Negative predictive value (NPV): is the probability of not having the disease if the diagnostic test is negative (that the patient is not a false negative): the patient is not suffering from the disease if the test is negative. The negative predictive value is calculated by the formula NPV=(number of individuals not suffering from the disease in whom the sign is absent)/(number of individuals not suffering from the disease in whom the sign is absent+number of individuals suffering from the disease in whom the sign is absent)

In order to obtain a good diagnostic test, it is important to both increase specificity and sensitivity.

In developing the assays and tests as herein disclosed, although the AUROC was very high when assessing Apo-A1 alone, it was increased when using other markers, such as age, sex or amount of other circulating proteins.

Specificity was increased and verified by using controls such as patients who have a liver disease (but not COVID-19).

Generally, a diagnosis (or diagnostic) method comprises
i. a step of gathering information from the patient
ii. a step of comparing said information with regards to thresholds
iii. a step of deducing, from the difference between the patient's information and the threshold, whether the patient has a specific disease or the stage of the patient's disease.

As a matter of illustration
i. the information that can be gathered from the patient can be gathered directly from the patient (such as images from NMR, scanner, radiography, contrast-enhanced computed tomography), or indirectly from the patient, such as from a biological sample that has been obtained from a patient (such as urine, blood sample.). The information can be presence (or absence) and/or level of specific biological markers, whether specific from the pathogenic determinant (bacterial or viral DNA), or elevated levels of patient's markers.
ii. once the information is obtained, it is compared to different values/standards and the deviation with regards to these standards is assessed. As a matter of illustration, the level of some biomarkers shall be compared to the level usually observed in healthy patients and to the levels usually observed in patients with the disease. Thresholds may exist, where 95% of patients having passed the threshold have the disease and 95% of the patients not having passed the threshold do not have the disease. For diseases where multiple clinical stages can be determined, such thresholds can discriminate the different stages. In this step ii, one may compare various types of information to their respective standards, in order to be able to reach a diagnostic in step iii (as a matter of illustration, one can use the values and information obtained from measurement of various blood or plasma markers, images from scanner and of Body Mass Index).
iii. the last step is actually making the diagnosis i.e. deciding whether or not the patient has the condition sought, taking, in particular, into account the information gathered from the patient, the thresholds as described above. The physician may also take into account other elements (such as the consistency of the information gathered or the like) to make the diagnostic.

Some methods, such as the ones disclosed in the present application, may also include a step i.a), which comprise the steps of modifying the information obtained from the patient in order to obtain a new type of information, which is the one that is then compared to the standards in step ii. Such modification is the combination of the values of variables in a function, and obtaining an end value.

It is further to be noted that the mere measurement of the values of levels of markers in the plasma or serum of a patient and the combination thereof in an algorithm or function as herein disclosed is part of a method but only provides an intermediate result (an index) that would then to be compared to a reference index, in order to actually be able to pose the diagnostic.

It is also to be noted that the tests herein disclosed are not "gold-standard" tests, in the sense that the output (index calculated by the formulas herein disclosed) isn't a direct answer as to the state of the patient. Indeed, these tests are based on statistics and there may thus be false-positive or false-negative results, which is the reason why the specific experience of the physician in interpreting the index is of importance for reaching a diagnosis.

However, due to the specificity, sensitivity, positive predictive value and negative predictive value of the tests, herein provided for various thresholds of the index, these tests are of great interest in provided a help to the physician when investigating a clinical case. Consequently, step iii as disclosed above is not direct and immediate from step ii, as the physician must interpret the result from the clinical and general context to be able to reach a diagnosis.

The invention thus relates to a method for detecting whether a patient is infected with the SARS-CoV-2 virus, comprising:
  a) Determining the level of apolipoprotein A1 (apoA1) in a serum sample from said patient and optionally of other clinical markers
  b) when other markers are used, combining the values obtained in a) through a function in order to obtain an end result
  c) Comparing the level of apolipoprotein A1 measured in step a) or of the end value obtained in step b) to a predetermined threshold
wherein the patient is infected with the SARS-Cov-2 virus if the level of apolipoprotein A1 measured in step a) is lower than the threshold, or of the end value obtained in step b) is higher than the threshold.

It is to be noted that one can say that the method also provides information as to whether a patient is susceptible to be infected by SARS-CoV-2. Indeed, all tests of diagnosis present false positive (and false negative). However, in the present case, the examples demonstrate a high specificity and a high sensitivity, thereby giving a high classification accuracy of the patients.

Alternatively, the method is very appropriate to detect whether a patient is not infected with the SARS-CoV-2 virus. Indeed, as disclosed below, the sensitivity and specificity of the methods are very high. However, depending on the prevalence of the SARS-Cov-2 virus infection (it is expected to be below 10%), it may be sometimes more appropriate to rely on the negative predictive value (although the positive predictive value remains high in view when the specificity is high). It may thus be preferable to use the methods herein disclosed to identify patients that are not infected by the SARS-Cov-2 virus (negative patients), and to perform other appropriate tests on patients that are positive to the disclosed method (such as PCR tests, or lung scanner) to confirm the SARS-Cov-2 virus infection. In particular, the tests have a high Negative Predictive Value (the patient is not infected when the test is negative), therefore allowing reducing the number of patients that need to be tested for the direct presence of the virus (RT-PCR, antigenic testing).

The above method is performed in vitro or ex vivo on samples of the patients that are already held by the person performing the method.

It is to be noted that the inventors have engineered a test where the value of Apo-A1 alone can be used, and when the diagnosis may be performed when it is below a given threshold (preferably 1.25 WI). When it is combined with other markers (such as the ones disclosed below) such combination will provide an end value. Depending on the sign of the coefficients for each markers, the diagnosis of infection with the SARS-Cov-2 virus may be linked to an end value above or below a given threshold.

As shown in the examples, the amount of Apo-A1 alone is enough to allow the physician to conclude on the infection by the SARS-CoV-2 virus, especially during an outbreak and when the patient has other signs of infection. However, it is also envisaged to use other clinical markers from the patient, in particular selected from the group consisting of age of the patient (Age), gender (Sex), $\alpha 2$-macroglobulin (A2M), gammaglutamyl transpeptidase (GGT), and haptoglobin (Hapto). It is also possible to use inflammation markers, such as CRP (C Reactive protein), Serum amyloid A, or D-dimers. A positive D-dimer result may indicate the presence of an abnormally high level of fibrin degradation products and indicates that there may be significant blood clot (thrombus) formation and breakdown in the body, which is consistent with the Covid-19 pathology. Serum amyloid A (SAA) proteins are a family of apolipoproteins associated with high-density lipoprotein (HDL) in plasma and secreted during the acute phase of inflammation.

For the biological markers, the amount of such markers in the patient's serum is used. For sex, the marker is used as a binary marker (1 for male, 0 for female). These markers can be used alone or in combination. When multiple markers are used in addition of the level of Apo-A1, one shall combine all markers in a function (in particular a logistic regression function) in order to get an end result, from the combination of the marker's values. The end result is then compared to a threshold in order to have the information necessary to pose the diagnosis. In another embodiment, the function is such that it assigns a discrete value when the level of Apo-A1 (or of another marker) is below a given limit (as indicated herein), another discrete value when such level of Apo-A1 (or of the other marker) is above the limit, and summing-up the discrete values to obtain the end value to compare to the threshold. The limit will depend on the marker studied for this kind of function.

Measurement of the amount of the markers can be performed by any method in the art. In particular, it can be performed by ELISA, by colorimetric assay or by Lateral Flow Assay.

The present application provides various thresholds. It is however understood that other threshold can be selected. Some of the thresholds proposed herein have been chosen as to classify the patients in three classes. When the end result is lower than a first threshold, the patient can be classified as SARS-Cov-2 positive (i.e. the threshold has been chosen so as to have a very low or even nil risk of false positive (high sensitivity)); when the end result is higher than a second threshold, the patient can be classified as SARS-Cov-2 negative (i.e. the threshold has been chosen so as to have a very low or even nil risk of false negative (high NPV)). Between the first and second thresholds, the physician can assess the infection by taking into account the whole clinical picture and perform other tests. Consequently, the present application describes two different thresholds, so as to provide assistance to the physician. It is however understood that other thresholds can be chosen by the one performing the methods herein disclosed, and that modifications of the thresholds will also lead to modifications of the specificity, sensitivity, NPV and PPV of the methods then used with these other thresholds.

In a specific embodiment, the test combines, in a function, the value of apolipoprotein A-1 (Apo-A1) (g/l) and one or more of the following components:
(1) alpha2-macroglobulin (A2M) (g/l)
(2) Age (years)
(3) Gender (0 for women, 1 for men)
(4) Haptoglobin (Hapto) (g/l)
(5) gamma-glutamyl transpeptidase (GGT) (IU/l).

The function preferably doesn't use the value of bilirubin or of transaminases (alanine aminotransferase (ALT) or aspartate aminotransferase, AST)).

Using GGT makes it possible to increase sensitivity (the Receiving Operating Curve is moved to the upper left) and increase AUROC.

The use of A2M is interesting to discard false positive patients (with severe liver diseases such as severe acute alcoholic hepatitis (ASH) or Drug-Induced Liver Injury (DILI)).

In a specific embodiment, though, Apo-A1 is used alone and the cut-off is about 1.25 g/L (Sensitivity: 0.9063; specificity: 0.9614; NPV: 0.9983). this simple threshold makes it possible to easily detect patients that are not infected by SARS-CoV-2 (i.e. patients for which the Apo-A1 amount is higher than 1.25 g/L), as the NPV is very high. The AUROC is 0.978.

In another embodiment, Apo-A1 is used together with the age and the sex of the patient. Use of these three markers made it possible to obtain an AUROC of 0.962.

In another preferred embodiment, Apo-A1 is used together with haptoglobin the age and the sex of the patient. The concentration of Apo-A1 and Hapto are combined in a function with the age and the sex (0 for women, 1 for men)) of the patient. Use of these four markers made it possible to obtain an AUROC of 0.990.

One can use a function F7=b0+b1*ApoA1 (g/L)+b2*Log (hapto (g/L))+b3*AGE (years)+b4*SEX (0 for women, 1 for men), with
$3 \leq b0 \leq 4$
$-11.8 \leq b1 \leq -9.8$
$4 \leq b2 \leq 6$
$0.05 \leq b3 \leq 0.15$
$-1.15 \leq b4 \leq -0.85$ In particular, F7=3.63911−10.78715×ApoA1+5.02076×Log(hapto)+0.10164×AGE−0.98780×SEX ((1=male; 0=female)

This function presents an AUROC of 0.990 for a prevalence of 1.8%. For this function, one can use, as threshold, to which to compare the end value, a value that is lower than 0.015. In particular, when one uses 0.0096 as a threshold (when the end result is lower than the threshold, the patient is classified as SARS-CoV-2 negative), the sensitivity is 0.9706 and the specificity is 0.9475. Using a prevalence of 1.8%, this gives a PPV of 0.2514 and a NPV of 0.9994. This would allow selecting the patients for which a RT-PCR (current standard test) is to be performed and only perform tests for 7% of the patients rather than 100%, while having only 0.06% of the patients having a negative test being false negative.

When the prevalence is higher (which is often the case in point-of-cares), the NPV remains high. In particular, the NPV remains at 0.9946 for a prevalence of 15% in the tested population (amounting to 0.54% of false negative in the patient with a false negative test). For this prevalence, the PPV increases to 0.76, meaning that 76% of the patients with a positive test are true positive.

For a prevalence of 10%, the NPV is 0.996 and the PPV is 0.673.

In view of these results, the formula is of particular interest for mass screening of a population, as it allows discriminating the patients in true negative (very high NPV, even with a high prevalence) and thus selecting a lower number of patients for further testing (RT-PCT or antigenic tests).

In another embodiment, one uses a function that combines the level of apolipoprotein A1 (apoA1), the level of gammaglutamyl transpeptidase (GGT), the level of haptoglobin (Hapto), the age and the sex of the patient. Use of these five markers made it possible to obtain an AUROC of 0.975.

In a preferred embodiment, one uses a function that combines the level of apolipoprotein A1 (apoA1), the level of gammaglutamyl transpeptidase (GGT), the level of haptoglobin (Hapto), the level of a2-macroglobulin (A2M), the age and the sex of the patient.

One can use a function F6=a0+a1*ApoA1 (g/L)+a2*Log (hapto (g/L))+a3 Log(*GGT (IU/L))+a4*Log(A2M (g/L))+a5*Log(AGE (years))+a6*SEX (0 for women, 1 for men), with
$-23 \leq a0 \leq -19$
$-11.2 \leq a1 \leq -8.4$
$4.5 \leq a2 \leq 7.7$
$2.3 \leq a3 \leq 4.2$
$-0.75 \leq a4 \leq -0.25$
$11.5 \leq a5 \leq 15.5$
$-1.8 \leq a6 \leq -0.5$ In particular, F6=−21.12957 −9.80509*ApoA1+6.14688*Log(hapto)+3.29395*Log(GGT)−0.52093*Log(A2M)+13.64505*Log(AGE)−1.15945*SEX (1=male; 0=female)

For this function, if the end results is lower than 0.500 (sensitivity: 0.8516; specificity: 0.99933), the patient can be classified as SARS-CoV-2 negative. The AUROC is 0.9937. for a 1.7% prevalence, this would give a PPV of 0.9561 and a NPV of 0.9975. For a 7% prevalence, the PPV would be 0.9897 and the NPV would be 0.9889. The very high specificity allows a high PPV even with a low prevalence.

It is to be noted that other cut-off values can be chosen. Increasing the cut-off would increase the specificity but decrease the sensitivity, while decreasing the cut-off would lead to the opposite result. One can also take into account the prevalence to determine the PPV. The choice of the cut-off (threshold) is thus determined by the physician according to its choice to increase or not the sensitivity or selectivity.

The invention also includes a device for diagnosis of SARS-CoV-2 infection in a patient, comprising a first means, wherein the first means provides a first index by performing a method as described above, either by using the Apo-A1 amount alone or in combination with other markers.

Said first index can be later used to determine SARS-CoV-2 infection in said patient and whether it is necessary to initiate treatment or follow-up, or perform further investigations.

In a specific embodiment, the first mean is computerized. It may be an electronic spreadsheet with the formula recorded within, that provides the first index as an output when entering the various elements mentioned above. It can also be a computer program that provides the first index as an output after receipt of the various elements mentioned above.

The first means can present one or more of the following, in either combination:
- Operate within a private or public network
- Receive the inputs (values of the various elements mentioned above) from a sender that is in a remote place (i.e. they are sent to the first means from a different location that where the first means is located)
- Require the sender to identify himself before sending the inputs
- Receive the inputs (values of the various elements mentioned above) from a secure manner
- Send the output (first index) to the sender of the inputs
- Store the output in a database (possibly with a unique identifier, making it possible to assign inputs, outputs to this identifier)
- Provides the first index with further information (such as sensitivity and/or specificity and/or positive predictive value and/or negative predictive value linked to the prevalence of the condition in the population to which belongs the patient)

Is also foreseen a non-transitory computer readable storage medium, having stored thereon a computer program comprising program instructions, the computer program being loadable into a data-processing unit and adapted to cause the data-processing unit to carry out a method for calculating a first index by combining the values as measured from markers present in the serum or plasma of a patient through a method as disclosed above, when the computer program is run by the data-processing device.

The following examples are meant to describe an aspect of invention, but shall not be limiting the invention.

EXAMPLES

Example 1 Protocols

Ethics

Figure 1:
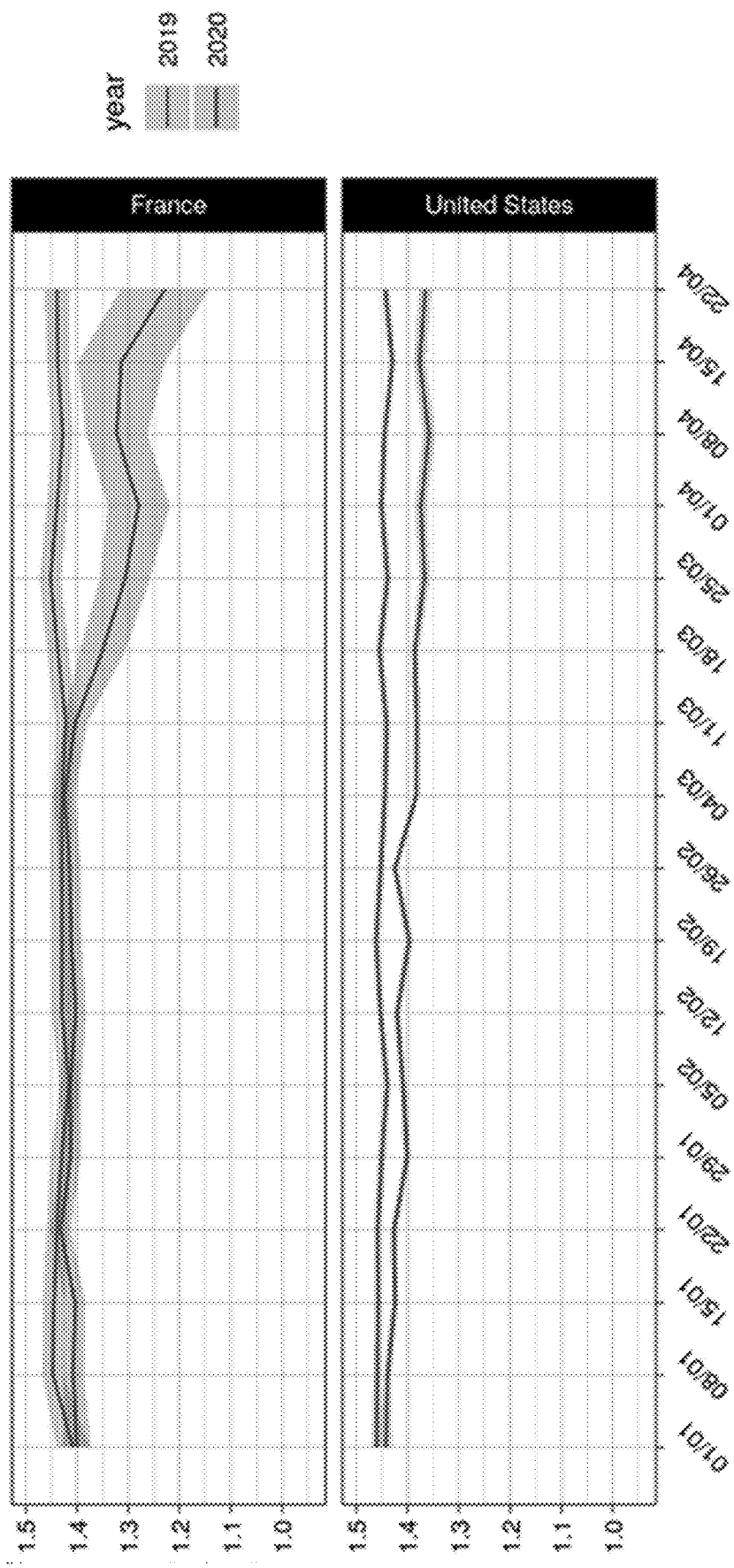
FIG. 1. Daily apolipoprotein-A1 values during the first 16 weeks of the year. (A) Stratified by country. Apolipoprotein-A1 means values (95% CI) decreased significantly (linear regression; P<0.001) both in France (upper panel) than in USA (lower panel) in 2020, more rapidly in France since the 11th week. In USA the decrease was already significant since the 2nd week. Means values were higher in USA than in France in 2019 and 2020. In USA the subjects were at risk of non-alcoholic fatty liver disease. In France, the subjects were mostly patients with chronic hepatitis C. (B) Stratified by gender and age in USA. (C) Proportion of serum with low apolipoprotein-A1, in the APHP-PSL covid-19 center, in France and in USA. Low apolipoprotein-A1 was defined as below 1.25 g/L, the cutoff defined having the higher Youden index. These three populations had respectively 4109, 26170, and 248 470 sera.
Figure 1:
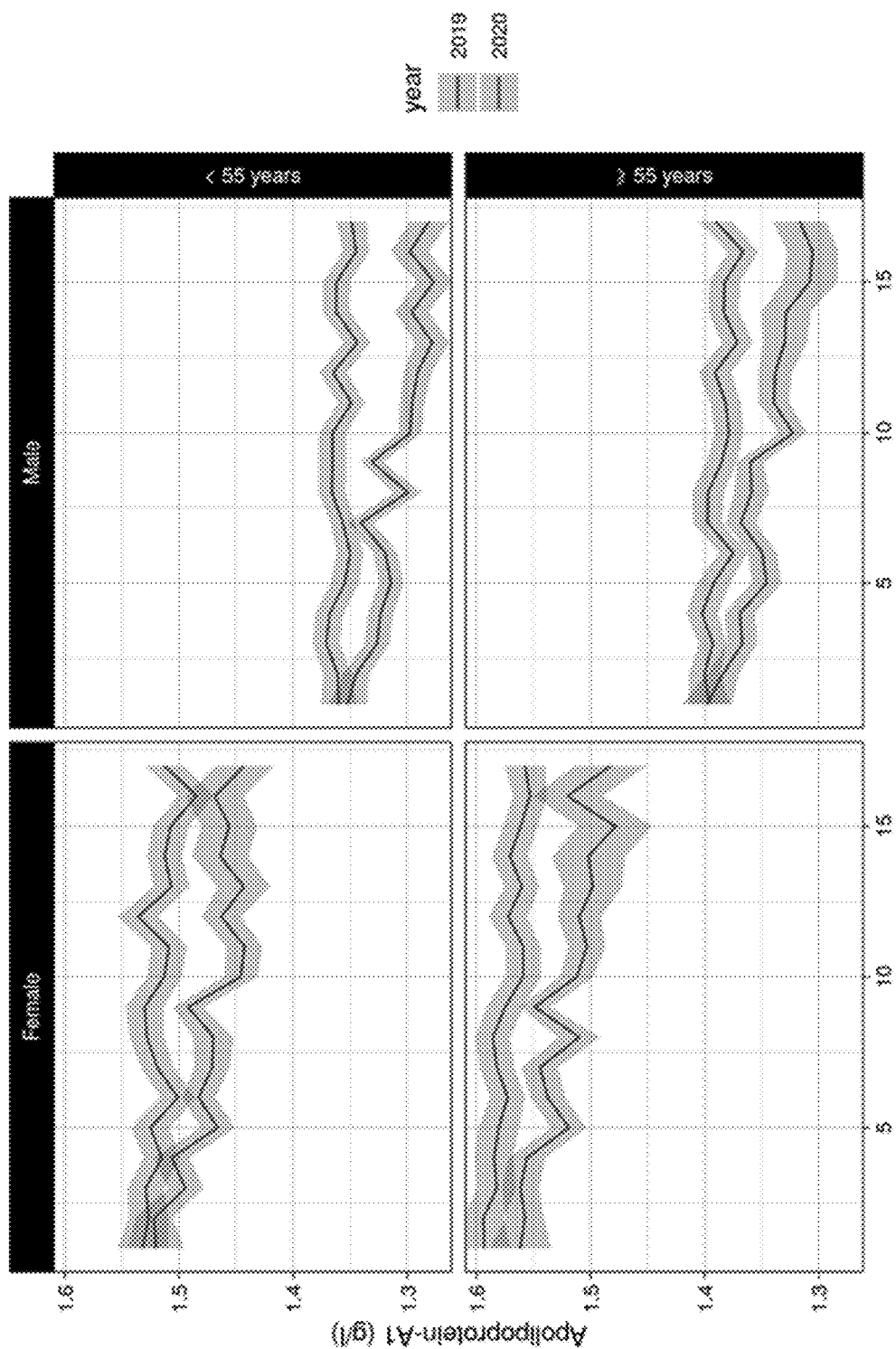
Figure 1:
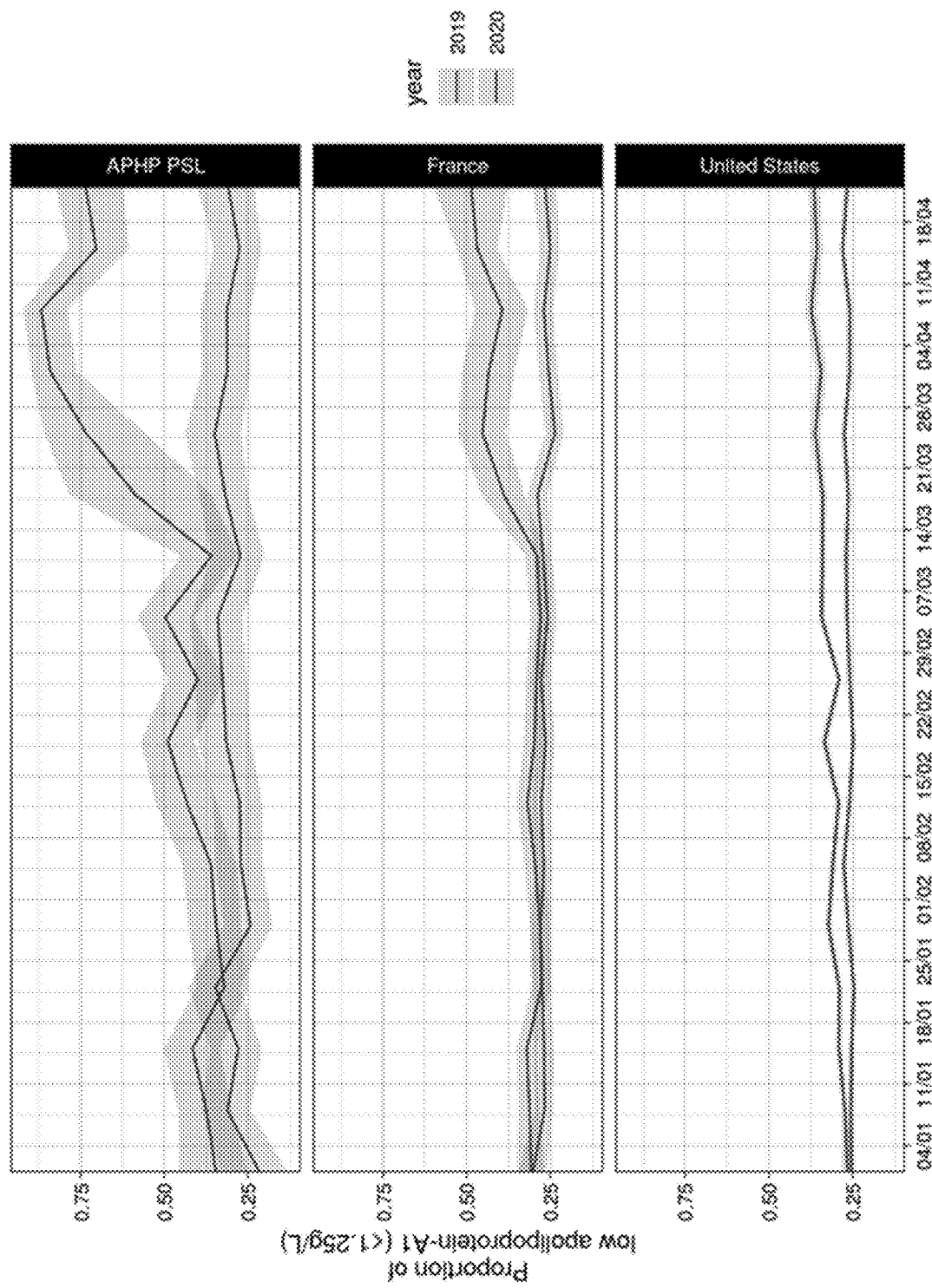
Figure 2:
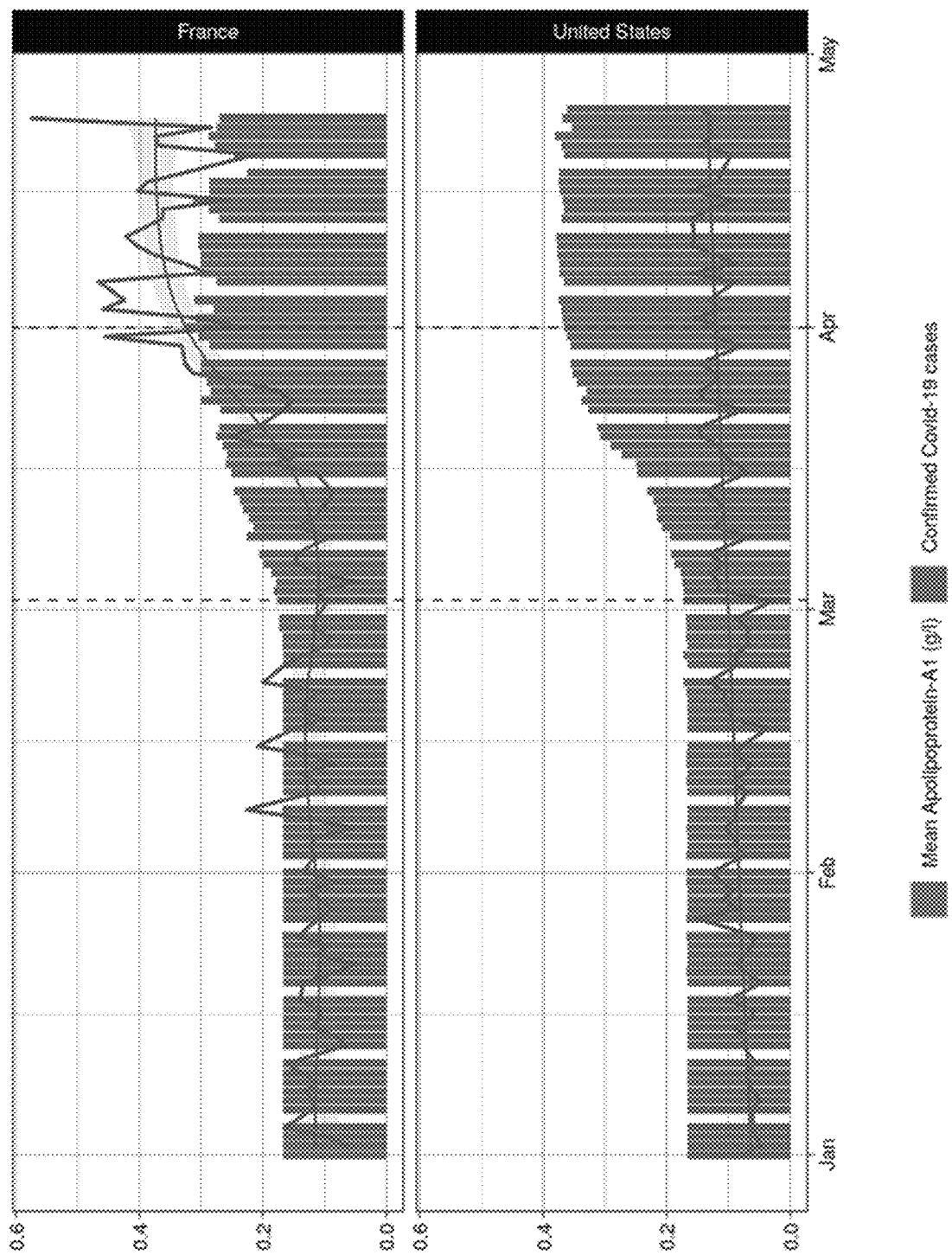
FIG. 2. Number of confirmed Covid-19 cases (per day, bars) and decrease of apolipoprotein-A1 (apoA1), absolute value and smoothed mean with 95% confidence interval. (A) Upper panel, data for France. (B) Lower panel, data for USA. In order to display the linear decrease of apoA1 along with exponential increase of covid-19 cases, the Y-axis for the decrease of apoA1 was expressed as 1.5−apoA1 value. For covid-19 cases we used a logarithmic scale divided by 20. i.e. on March 2nd (first green dotted line) 30 cases occurred in France and the mean value of apoA1 was 1.40 g/L. In USA 20 cases occurred in USA and the mean value of apoA1 was 1.48 g/L. i.e. on April 1st (second green dotted line) 7,578 cases occurred in France and the mean value of apoA1 was 1.27 g/L. In USA 24,998 cases occurred in USA and the mean value of apoA1 was 1.39 g/L.

The prospective observational study in covid-19 patients was approved by CER-Sorbonne University IRB, No 2020—CER-2020-14, with a signed informed consent. Clinical investigation was conducted according to the principles of the Declaration of Helsinki. The components of FibroTest (FibroSure in USA) and Nash-FibroTest (Nash-FibroSure in USA) were measured in routine in patients with a risk of liver disease in France and USA. The serum databases used anonymous results. All the retrospective databases of patients analyses previously published were non-interventional study, without supplementary blood sample, and exempt from institutional review board (IRB) review (ethical committee of 'Comité de Protection des Personnes of Paris, Ile-de-France' FIBROFRANCE project. CPP-IDF-VI, 10-1996-DR-964, DR-2012-222 and USA-NCT01927133).

Patients for Assessing the Sensitivity

The pre-inclusion criteria were consecutive patients examined in the internal medicine department of APHP-PSL hospital between 24 Jan. 2020 and 21 Apr. 2020, with a suspicion of covid-19, severe enough for admission, but not requiring intensive care unit or mechanical ventilation.

After signed informed consent, no supplementary tests were performed. The serum proteins of interest to assess the diagnostic and prognostic performances were routinely performed in all patients with a risk of liver disease. Apolipoprotein-A1 and haptoglobin, two biomarkers of acute phase, alpha-2 macroglobulin (A2M) which is not an acute phase protein in human but a marker of liver fibrosis, gammaglutamyl transpeptidase (GGT) and alanine aminotransferase (ALT) as standard sensitive "liver function tests" were performed.

The covid-19 diagnostic was defined as a SARS-CoV2 PCR-positive in upper respiratory samples, or in blood. All patients with PCR-negative despite symptoms of covid-19 and chest computed tomography signs of covid-19, or patients having a spouse SARS-CoV2 PCR-positive, were adjudicated (PC, MR, TP, OL). Exclusion criteria were non signed informed consent, missing data for blood markers and not adjudicated as clinical covid-19 in case of absence of positive PCR. No prospective controls were included, as it was impossible in the context of the pandemic to have a large sample representative of the general population.

Biochemistry

Apolipoprotein-A1, haptoglobin, A2M, GGT and ALT components assays were performed on an automatic analyzers Cobas-c701 and Cobas-c501 from Roche Diagnostics (Mannheim, Germany). Proteins concentrations were measured according to turbidimetric analytical methods using manufacturer reagents for haptoglobin and apolipoprotein-A1, and Diagam (Ghislenghien, Belgium) reagents for A2M. ALT was determined according to IFCC method with pyridoxal phosphate, and GGT using Szasz method and calibrator value given for the IFCC. Total bilirubin was assessed according to a diazoreaction.

The consecutive anonymous sera of populations routinely followed for liver diseases risk, mostly chronic hepatitis C in France (17,778 sera in 2019 and 12,500 in 2020) and patients at risk of NAFLD in USA (136,688 sera in 2019, and 111,782 sera in 2020), were analyzed for the same period in the first 16 weeks of 2019 and 2020, following the BioPredictive (Paris, France) analytical recommendations (10).

Virology

To diagnose SARS-CoV2 in upper respiratory samples, we used the fully automated sample-to-result two-target test Cobas 6800 SARS-CoV-2 (Roche molecular systems, Branchburg, NJ, USA) (11). The presence of SARS-CoV-2 in the lower respiratory samples and blood were tested by Altona RealStar® RT-PCR Kit 1.0 (Altona Diagnostics, Hamburg, Germany). Plasma samples were subjected to total nucleic acid (TNA) extraction by using the NucliSENS easyMAG extraction system (BioMerieux, France) and PCR was performed using LightCycler® 480 Instrument II (Roche, Switzerland)

Statistical Methods

The number of confirmed covid-19 cases in France and in the US was assessed according to the published data from the European Centre for Disease Prevention and Control (https://ourworldindata.org/coronavirus-data).

The linear regression curves with 95% confidence interval between the daily mean serum level of apolipoprotein-A1 were compared by F-test, and a significant difference was defined as P value <0.001. Regression curves were also used to assess possible confounding factors, such as country, gender and age, not only on apolipoproteinA1 but also on haptoglobin a marker of systemic inflammation, A2M a marker of liver fibrosis, and GGT and ALT, two standard liver function tests. Total serum bilirubin was also assessed, but as no changes were observed, not included in the results and discussion.

The sensitivity was assessed in patients with covid-19 as previously defined. To be able to use an early detection test in large populations, the specificity was assessed in six databases, including three at risk of false positive. The core analysis for the specificity assessment, was the general population study in healthy volunteers' representative of the French population aged 40 years or older. The performance of apolipoprotein-A1, haptoglobin, A2M, GGT and ALT were assessed using non-parametric AUROCs. The best cutoff was chosen as the serum apolipoprotein value giving the highest Youden index (sensitivity+specificity−1).

Statistical software used R and NCSS-2020.

Example 2. Apolipoprotein-A1 as a Sentinel Marker of Infection with SARS-CoV-2

There is an urgent need for efficient early detection of covid-19 in general population. Viral nucleic acid testing and chest computed tomography are standard methods for diagnosing covid-19 in patients with symptoms but are time consuming. In healthy general population, several predictors were identified such as age, sex, previous hospital admissions, comorbidity data, and social determinants of health. A recent review suggests that the proposed models are at high risk of bias, and that their predictive performance when used in practice is probably lower than that reported (1).

In the meantime, several early detection tests of cytokine burst could be immediately available. In 1920, Harold A. Kipp found that a decrease in serum cholesterol was a marker of severe pneumonia (2). One hundred years later, a meta-analysis showed some association of high-density lipoprotein cholesterol (HDL) and apolipoprotein-A1 and an increased (twice) mortality rate (odds ratio=2.0; 95% CI 1.2-3.2) in 791 patients with severe sepsis (fig. S1 which is FIG. 3 of Liu, 2020) (3). Apolipoprotein-A1 has also been studied in relationship with inflammation (4, 5).

It was hypothesized first that apolipoprotein-A1 and haptoglobin could help to detect the spread of SARS-CoV-2, and the databases of FibroTest (FibroSure in USA), a multi-analytes liver diagnosis which includes these proteins (6) and which is widely used in large surveillance of subjects at risk of cirrhosis and primary liver cancer (7-9) were analyzed. Two unexpected results suggested new mechanisms for the decrease of ApoA1. Firstly, the decrease was observed several weeks before the significant increase of confirmed Covid-19 cases and secondly, it was not associated with an increase of haptoglobin which appeared later in Covid-19 centers. These facts open speculations on the role of SARS-CoV-2 on the decrease of intestinal absorption of apoA1 and to a potential fecal-oral transmission.

Therefore, it was aimed to illustrate that other existing surveillances in the world using apolipoprotein-A1 could also validate and participate to such sentinel networks for viral pandemic. In the present study, the performance of apolipoprotein-A1 as a predictor of hospital admission for covid-19 in general population was not assessed, neither its ability to detect covid-19 in patients with symptoms, or for constructing a multivariable covid-19 related prediction model.

To assess the daily association between the serum apolipoprotein-A1 and the spread of covid-19, the consecutive results of three populations were used. Two were large surveillance cohorts of subjects at risk of mixed chronic liver disease in France, and at risk of non-alcoholic fatty liver disease (NAFLD) in USA. The third was the patients of Pitié-Salpêtrière hospital (APHP-PSL, Paris, France), a reference center for both covid-19 and liver disease.

To assess the diagnostic performances of apolipoprotein-A1, its sensitivity in a prospective non-interventional study in covid-19 patients was assessed, and its specificity was assessed in representative controls of a general population.

The mean of serum apolipoprotein-A1 daily during the first 16 weeks of 2020 in a population routinely followed for liver diseases risk, was compared in France (12,500 sera) and in USA (111,782 sera), in parallel with the local raise of confirmed cases, and in comparison with the same days of 2019 (respectively 17,779 and 136,688 sera). Its sensitivity was assessed prospectively in an observational study of 128 consecutive adjudicated hospitalized cases and retrospectively its specificity in 7,482 controls representative of general population.

The mean serum level of apolipoprotein-A1 in these populations was already decreasing since January 2020, in comparison with the similar 16 weeks in 2019. This decrease was highly correlated and parallel with the daily increase of confirmed covid-19 cases, in the following 16 weeks, in France and USA. Apolipoprotein-A1 at the 1.25 g/L cutoff had a sensitivity of 90.6% (95% CI 84.2-95.1) and a specificity of 96.1% (95.7-96.6%) for the diagnostic of covid-19. The area under the characteristics curve was 0.978 (0.957-0.988), and outperformed haptoglobin and the liver function tests.

Apolipoprotein-A1 could be used both as a sentinel of the pandemic in existing routine surveillance of the general population, as well as a candidate predictor of suspected covid-19 in multivariable model, for cases with negative virologic test.

Results

Temporal Associations Between Apolipoprotein-A1 and Covid-19

It is reported here that the mean serum level of apolipoprotein-A1 in these populations had already been decreasing since January 2020, both in France and in the USA (FIG. 1), in comparison with the 16 first weeks of 2019, when the same surveillance populations were not exposed to SARS-CoV-2. Apolipoprotein-A1 means values (95% CI) decreased significantly (linear regression; P<0.001) both in France (upper panel) and in the USA (lower panel) in 2020, more rapidly in France since the $11^{th}$ week. In the USA the decrease was already significant since the $2^{nd}$ week of January (FIG. 1A). Mean values were higher in the USA than in France in 2019 and 2020. In the USA, subjects were all at risk of non-alcoholic fatty liver disease. In France, the subjects were mostly patients with chronic hepatitis C.

From January to March 2020, before the start of the pandemic awareness, there was no variability in the daily number of sera analyzed in France and USA in comparison with January to March 2019, and the decrease of apolipoprotein-A1 was already significant, whatever the age and gender. There was a delay of 10 days between the start of the pandemic between France and USA. The demographic and biochemical characteristics of the anonymous sera included in the US surveillance analysis for the first 16 weeks on 2020 and 2019 were very similar during the 16 weeks. Due to the sample size 111,782 and 136,688 sera in 2020 and 2019 respectively, most of the characteristics were significantly different, but reassuring for the risk of bias related to confounding factors associated with apolipoprotein A1 decrease, without more severe fibrosis stage. As apolipoprotein-A1 is one component of FibroTest, one confounding factor in such patients at risk of liver fibrosis could be a higher prevalence of severe fibrosis in the 2020 population. Indeed, the inverse was observed. In the 2020 population the prevalence of not severe fibrosis (stage F0 to F2) was 20.3% vs 22.0% in 2019 in line with the decrease of A2M, and GTT.

This apolipoprotein-A1 decrease since January 2020 was highly correlated and followed the same trend than the daily increase of confirmed covid-19 cases, in the following 16 weeks, in France and in the USA. Apolipoprotein-A1 mean values (95% CI) decreased significantly both in France (upper panel) and in the USA (lower panel) in 2020. In the USA, the decrease was already significant since the $2^{nd}$ week of January, earlier than in France where a decrease was only significant since the $11^{th}$ week. The later and dramatic increase of haptoglobin is in line with the studies of acute phase proteins in severe sepsis and in covid-19 series (3-5, 12). The kinetics of apolipoprotein-A1 were not associated with those of haptoglobin (not shown), which is also in line with different possible mechanisms occurring at the early acute phase (12).

ApoA1 decrease could be also explained by a severe DILI, such as an acetaminophen misuse or by a decompensation of end-stage liver disease in patients with previous chronic viral hepatitis, or as severe NASH. The prevalence of such cases seems to rare to explain the significant decrease in ApoA1 observed already in January 2020. Therefore, other another explanation compatible with these facts could be an impact of the SARS-CoV2 virus on synthesis of apoA1, in patients still asymptomatic.

Temporal association between apolipoprotein-A1 and covid-19 can be due to many confounding factors. The possible variability related to country, gender, age, and severe liver fibrosis stage were assessed. The decrease of serum apolipoprotein-A1 was similar according to gender, and to age both in France and in the USA (not shown). Only the sample size of the USA database permitted to assess the kinetics of apolipoprotein-A1 according to stratifications by both gender and age (FIG. 1 B).

An overview estimated that one third of patients with severe covid-19 had an impaired hepatic function, based on standard liver function tests (13). The causes can be due to the SARS-CoV-2 direct liver toxicity (14), but also to drug induced liver disease (DILI) caused by medications such as paracetamol, ibuprofen, clavulinate or chloroquine, or to a previous liver disease. To assess if the changes in apolipoprotein-A1 were associated with liver fibrosis, the daily kinetics of A2M which is not an acute phase protein in human but a marker of liver fibrosis were also analyzed (6, 15), and no changes were observed. To assess if the changes were not associated with other liver features (steatosis and hepatic inflammation) the daily kinetics of GGT, and ALT as standard sensitive "liver function tests" were analyzed. There was a significant increase of GGT during 2020 versus 2019, starting earlier in France and of ALT in April 2020, only significant in the USA. A very significant "center effect" on the regression curves was observed in France, probably due to an increase of the proportion of sera coming from the covid-19 centers. In the USA, the much bigger sample size probably prevented such a center effect.

Diagnostic Performance of Apolipoprotein-A1

The first patient with covid-19 was admitted in the hospital on the 30 Jan. 2020. The study started on the 19 Feb. 2020 and the last patient of the present report was included on the 21 Apr. 2020. A total of 128 consecutive patients with severe covid-19 (PCR-SARS-CoV-2 positive), but who did not require intensive care, were hospitalized in the department of internal medicine. Characteristics of patients' PCR covid-19 positive were similar to those published in such severity profiles (16).

Figure 3:
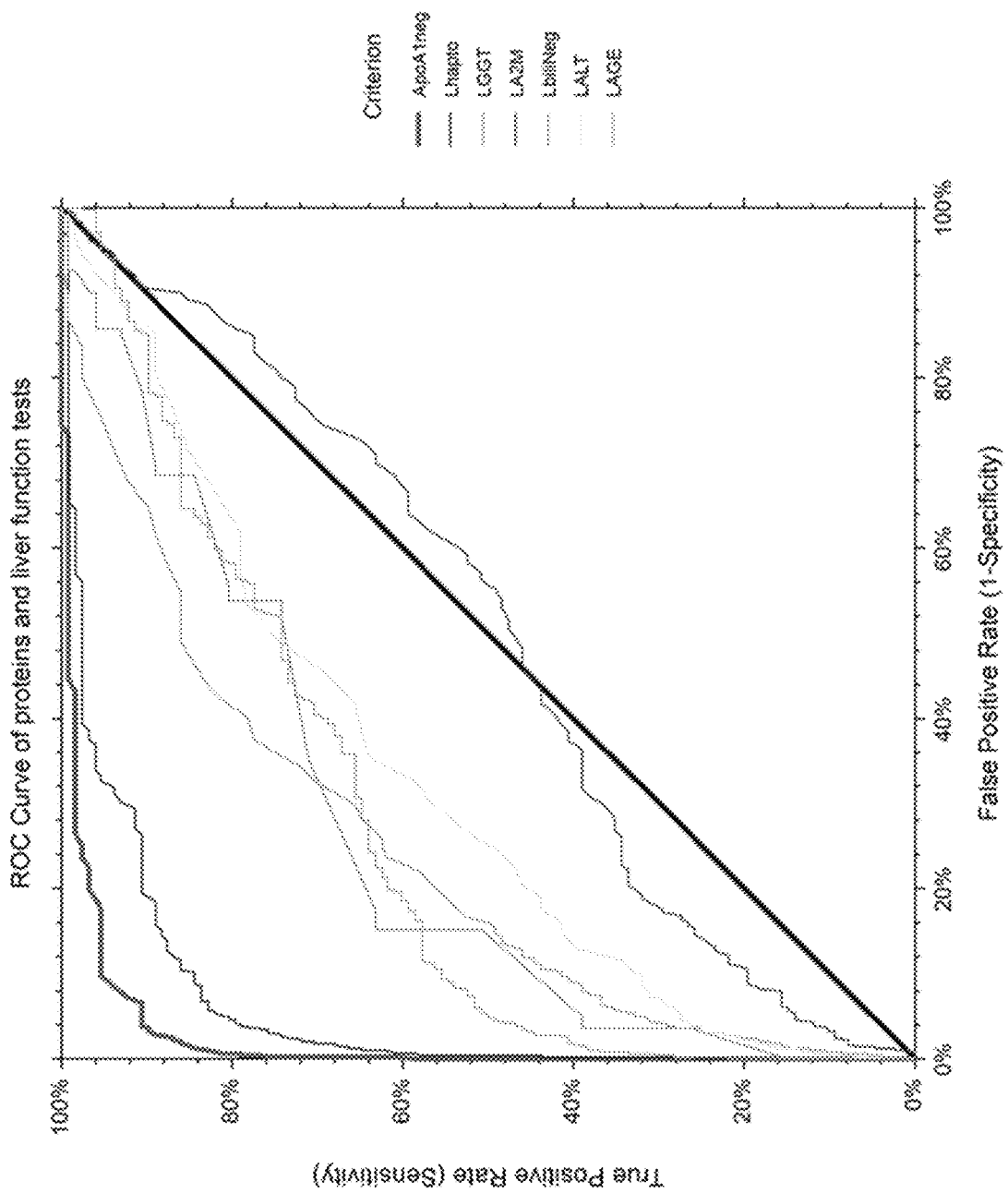
FIG. 3. Diagnostic performance of apolipoprotein-A1 for the diagnostic of Covid-19 in 128 Covid-19 cases and 7,482 healthy volunteers controls. Apolipoprotein-A1 at the 1.25 g/L cutoff, had a sensitivity of 90.6% (95% CI 84.2-95.1) and a specificity of 96.1% (95.7-96.6%) for the diagnostic of covid-19.

For the first time apolipoprotein-A1 was assessed in covid-19. The area under the characteristics curve (AU-ROC) in 128 covid-19 cases and 7,482 controls representative of the French population 40 years and older (7), was 0.978 (0.957-0.988), and outperformed haptoglobin and the liver function tests (FIG. 3, Table 1). Apolipoprotein-A1 at the 1.25 g/L cutoff, had the best Youden index (sensitivity+specificity−1=86.7%) with a sensitivity of 90.6% (95% CI 84.2-95.1) and a specificity of 96.1% (95% CI 95.7-96.6%) for the diagnostic of covid-19.

TABLE 1

Diagnostic performance of apolipoprotein-A1 for the diagnostic of covid-19 in 128 covid-19 cases and 7,482 healthy volunteers' controls.

| Criterion | Count | AUC | Standard Error | P-Value vs ApoA1 | Lower 95% CI | Upper 95% CI |
|---|---|---|---|---|---|---|
| ApoA1neg | 7610 | 0.9779 | 0.0075 | NA | 0.9572 | 0.9887 |
| Lhapto | 7610 | 0.9435 | 0.0123 | 0.009 | 0.9138 | 0.9631 |
| LGGT | 7610 | 0.7667 | 0.0213 | <0.001 | 0.7217 | 0.8053 |
| LA2M | 7610 | 0.5084 | 0.0300 | <0.001 | 0.4472 | 0.5648 |
| LbiliNeg | 7610 | 0.7442 | 0.0262 | <0.001 | 0.6883 | 0.7913 |
| LALT | 7610 | 0.6802 | 0.0269 | <0.001 | 0.6238 | 0.7294 |
| LAGE | 7610 | 0.7436 | 0.0289 | <0.001 | 0.6815 | 0.7950 |

In the same department of internal medicine during the 16-weeks period, 43 patients with mixed severe diseases were consecutively pre-included, but not adjudicated as covid-19. They could not be used for assessing the specificity of apolipoprotein-A1, according to the small sample size and as they were not representative of the context of use of an early detection test in general population.

However, data on apolipoprotein-A1 was prospectively cumulated since a first cohort of alcoholic liver disease in 1982 (17), then in the FibroFrance cohort (6-10). More recently six databases prior to the pandemic were collected, which allowed to validate retrospectively the specificity in a large spectrum of subjects. The measurements have all been performed on fresh serum collected prospectively and analyzed in the biochemistry unit of APHP-PSL hospital, with the same biochemical methods than for the covid-19 cases.

Figure 4:
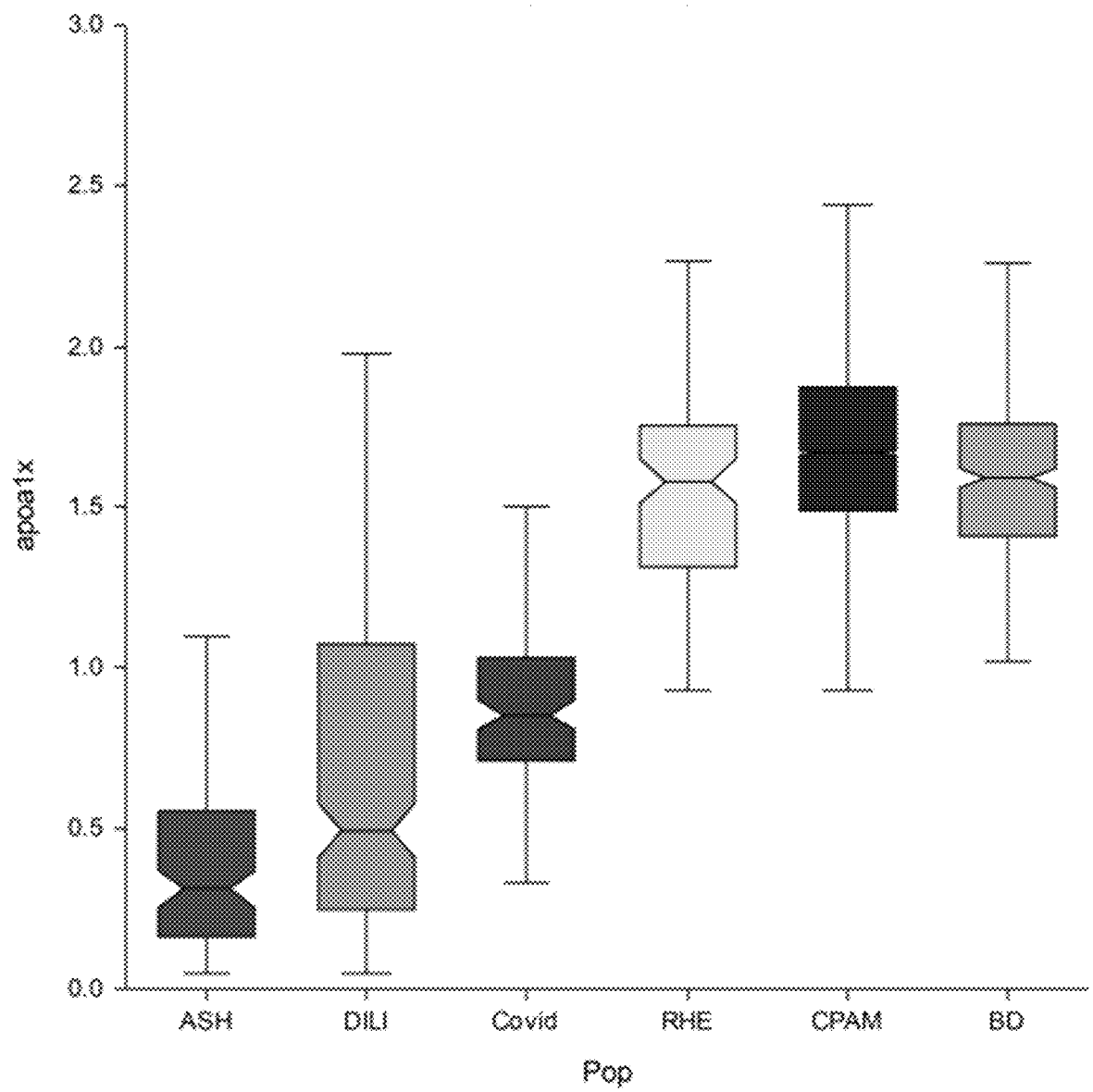
FIG. 4. Serum apolipoprotein levels (IQR) between the 6 populations assessing sensitivity (covid-19), and specificity (CPAM: general population used for the core analysis) liver diseases (ASH: severe acute alcoholic hepatitis, DILI: Drug induced liver disease, RHE: Rheumatology patients) and blood donors (BD). The total number is 8,336 subjects. (8,336 subjects)

For specificity assessment and the choice of the best apolipoprotein-A1 cutoff, the study of 7,482 healthy volunteers aged 40 years and older, representative of the French population (7) was chosen as the core control population. To assess the impact on the specificity of apolipoprotein-A1 three populations at risk of false positive (FIG. 4, Table 2) were added successively: a population of 100 patients with rheumatologic diseases who had chronic inflammation and possible variability of acute phase proteins (18), and two populations where it was known that apolipoprotein-A1 had dramatically decreased, 238 patients with severe drug induced liver disease (DILI) (18-19), and 123 patients with severe alcoholic hepatitis (20). The decrease was related to liver fibrosis stage (21) and hepatic insufficiency (18-19). 393 blood donors were also included to assess the specificity in younger controls than in the core control population (22).

TABLE 2

Serum apolipoprotein levels between the 6 populations assessing sensitivity (covid-19), and specificity (CPAM: general population used for the core analysis) liver diseases (ASH: severe acute alcoholic hepatitis, DILI: Drug induced liver disease, RHE: Rheumatology patients) and blood donors (BD).

| Control subjects | Count | Median | Dunnets' test difference (P < 0.05) |
|---|---|---|---|
| ASH | 123 | 0.31 | DILI, covid, RHE, CPAM, BD |
| DILI | 238 | 0.49 | ASH, covid, RHE, CPAM, BD |
| covid-19 | 128 | 0.86 | ASH, DILI, RHE, CPAM, BD |
| RHE | 100 | 1.58 | ASH, DILI, covid, CPAM |
| CPAM | 7482 | 1.67 | ASH, DILI, covid, RHE, BD |
| BD | 393 | 1.59 | ASH, DILI, covid, CPAM |

When using the same 1.25 g/L cutoff the specificity in 393 blood donors was similar (94.2%; 95% CI 83.5-93.8%, AUC 0.9697), lower (84.0%; 95% CI 75.3-90.6%, AUC 0.9505) for 100 patients with rheumatologic disease. Finally, this database integrated six databases with a total of 8,464 subjects: 128 covid-19 (prevalence 1.51%) and 8,336 controls. Despite the higher risk of false positive and using the pre-defined 1.25 g/L cutoff of the core control population, a reassuring specificity of apolipoprotein-A1 of 92.3% (95% CI 91.7-92.8%), and an AUROC of 0.946 (95% CI 0.929-0.959) are reported.

The sensitivity with cutoff <1.25 g/L was 90.6% (98/116). Interestingly the sensitivity among the 19 patients with negative viral nucleic acid testing was similar 18/19 (94.7%) than in patients positive, 98/109 (89.9%; exact Fisher test P=1). Thereafter, the 1.25 g/L cutoff was used to assess the proportion of low apolipoprotein-A1 among the surveillance populations during the 16 weeks of January (FIG. 1 C). In the APHP-PSL hospital, at the peak of the pandemic in Paris (first week of April) the proportion of low apolipoprotein-A1 in serum was 90% (upper panel) as expected by the sensitivity observed at admission of covid-19 patients. According to the serum sample size of each population, the proportion of low apolipoprotein-A1 was linearly increasing since the first week 2020 in USA vs 2019 reaching 10% more low apolipoprotein-A1 in April. The proportion of low apolipoprotein-A1 reached 50% on the 16th week of surveillance in France and on the 8th week in APHP-PSL.

Discussion

It is reported here that apolipoprotein-A1 had a significant negative daily temporal association with the number of confirmed covid-19 cases, had a high sensitivity in prospective hospitalized patients, and had a high specificity in retrospective controls. The strength and the limitations of these results must be discussed successively.

Temporal Association

The intriguing fact was the very early decrease observed since January 2020 in the USA while the number of covid-19 cases was unknown, and only in March in France. The first known covid-19 patient was detected on 27 Dec. 2019 and 19 Jan. 2020 in France (23) and USA (24) respectively. One simple explanation could be due to the much larger sample size of the US surveillance population, in comparison with the French surveillance, which permitted to detect in January a 1% significant increase in the proportion of subject possibly infected using the 1.25 g/L cutoff (FIG. 1 C). There was no obvious bias in age or sex or other event which could change the characteristics of patients followed for NAFLD or chronic viral hepatitis. Therefore, these suggested that the spread of the pandemic in the USA could be around 10%, the plateau reached since April in the population followed for NAFLD. In France the proportion can be only estimated reasonably up to 14$^{th}$ of March before the knockdown and the dramatic decrease of sera collected. Therefore, the spread of the pandemic could be around 5 to 10% in this population of mixed liver disease. These extrapolations from the proportion of low apolipoprotein-A1 are not so different than the recent French modelling that predicted 3% to 5% on March 15$^{th}$. They are very different from the unpublished controversial UK modelling study (BMJ 2020; 368:m1216). These data indicated that by March 19$^{th}$ (15 days after the first reported UK death, and 45 days after the first confirmed case), between 36% and 68% of the UK population would have been infected, depending on the assumptions used. Applying the same modelling for France, 45 days after the first case on Dec. 2019 27, that is February 18$^{th}$, the proportion of infected cases in France would be between 36% to 68%.

Such temporal association between apolipoprotein-A1 and covid-19 can be due to many confounding factors. In the context of the pandemic it was not possible to perform an ideal study including a prospective population representative of the general population of the country, but only of the patients requiring surveillance by liver fibrosis biomarkers. Sera were analyzed anonymously and therefore there was an unknown percentage of duplicated subject. However, the decrease of apolipoprotein-A1 in 2020 vs 2019 could not be explained, at least by gender, age, and severity of liver disease. The decrease of serum apolipoprotein-A1 was similar according to gender, and to age both in France and in the USA. Only the sample size of the USA database permitted to assess the kinetics of apolipoprotein-A1 according to stratifications by both gender and age (FIG. 1 B). The two large surveillance populations were patients at risk of liver diseases and were not representative of the general population of France and USA. Therefore, it was mandatory to check that A2M, a marker of liver fibrosis (6), had no changes during the 16 weeks of 2019 and 2020. In case of severe fibrosis A2M is very significantly increased (6-9). This stable A2M value as well as the 2020 lower prevalence of severe fibrosis stages eliminate a decrease of apolipoprotein-A1 due to an increase of severe fibrosis in the two surveillance populations, such as chronic viral hepatitis, alcoholic hepatitis, or non-alcohol-steatohepatitis (NASH). ApoA1 decrease could be also explained by a severe DILI, such as an acetaminophen misuse or by a decompensation of end-stage liver disease in patients with severe NASH. The prevalence of such cases seems too rare to explain a significant decrease in ApoA1 observed already in January 2020. Moreover, the other serum biomarkers did not change during the first 3 months including, haptoglobin, GGT, ALT. No active drug for NAFLD or NASH appeared between 2019 and 2020. Possible changes in the treatment of diabetes, dyslipidemia and obesity (bariatric surgery) could also be related to apoA1-decrease. However, after stratification on age and sex, no significant changes were observed for total cholesterol, triglycerides, fasting glucose, weight and height.

Using the data of the APHP-PSL hospital, the risk of other confounding factors was assessed in more details, both in patients with covid-19 and in controls. After the admission of the first patient with covid-19 the 30 Jan. 2020, several units of the hospital were transformed into one covid-19 reference center in March 2020. Due to the country-wide lockdown decisions, there was a dramatic decrease in the throughput of FibroTest prescription, decreasing to 12.5% in April 2020 in France and in the USA. In APHP-PSL, the throughput of prescriptions in April 2020 was still between 35% to 50% versus a mean of 12.5% in France. This center-effect can be explained by the conversion of the APHP-PSL hospital into a covid-19 center with a dramatic increase in severe cases. In USA, the decrease of apolipoprotein-A1 was almost linear, and haptoglobin remained stable without such reference-center effects (FIG. 1 C).

Specificity of Apolipoprotein-A1

According to the context of use of an early detection test in asymptomatic subjects, the ideal population for assessing the specificity was a prospective sample representative of the general population, the absence of covid-19 being assessed by negative viral nucleic acid testing and normal chest computed tomography. Due to the context of the covid-19 pandemic, it was impossible to perform such a study. However, our databases in severe liver diseases permitted to identify the major risks of significant decrease of apolipoprotein-A1 (false negative) which were mainly the severe fibrosis of end-stage liver disease of chronic hepatitis, acute alcoholic hepatitis, and DILI. It is acknowledged that the possible impact of malnutrition on serum apolipoprotein-A1 value has not been assessed here. It is however considered that this factor was not relevant in the study.

Sensitivity

It is acknowledged that the population included for sensitivity assessment may not be the ideal one, as there may be a risk of overestimation of the sensitivity estimated in severe disease, for a context of use in asymptomatic infected subject. However even if these patients were severe enough to justify their admission with a median of 70 years of age, none of them needed mechanical ventilation, 86% survived, 6% were transferred in intensive care unit, and 9% died. To validate the sensitivity of apolipoprotein-A1, a large number of asymptomatic subjects positive for SARS-CoV-2 viral nucleic acid testing was needed. At least, the sensitivity in the prospective study was similar among the 19 patients with negative viral nucleic acid testing (94.7%) to in patients positive (89.9%). The simple measure of apolipoprotein-A1 is therefore useful for clinicians according to the high percentage of false negative of available viral nucleic acid testing (25). When apolipoprotein-A1 is expressed using 1.25 g/L the cutoff identified by the core control population the sensitivity of 90% is retrieved in all patients of the APHP-PSL hospital which was expected. This cutoff permitted an extrapolation for predicting the proportion of patients infected the large surveillance populations. The spread of the pandemic could be around 5 to 10% in this population of mixed liver disease, in line with the recent prediction modelling of 3 to 5% at the same date in France (26). For the USA the extrapolation in the population with NAFLD is around 9-11%. These predicted proportion are challenging, due to the absence of validations using SARS-CoV-2-antibodies. However, this surveillance population is particularly at risk of covid-19, according to the prevalence of obesity and type-2 diabetes (15). External and independent validations of the results in other large samples of general population shall be performed. Apolipoprotein-A1 or HDL-cholesterol are already assessed in many ongoing large surveillances, of patients with chronic diseases such as cardiovascular, cancer and metabolic diseases, and could rapidly validate our results.

Rational of the Early Decrease of apoA1 Before the Recognition of the Pandemic

No major confounding factors, (age, gender, weight, fasting glucose, total cholesterol, triglycerides, and severe liver fibrosis) were found, which could explain the very early temporal association between the decrease of apo-A1 and the spread of the pandemic in the US population of patients followed for NAFLD. The mechanisms explaining the decrease of apo-A1 in late severe covid-19 pneumonia are well known, but not those explaining the early decrease before the acute phase. In patients with severe pneumonia, published evidence-based results demonstrated that apo-A1 decrease was associated with acute inflammation, the "cytokine storm" with an increase of IL6 and acute phase proteins such as CRP and haptoglobin. Here in the US population, the decrease of apolipoprotein-A1 was not associated with an increase of haptoglobin. This dissociation suggested different mechanisms for the early impact of SARS-CoV2 virus on synthesis of apoA1.

It is speculated that SARS-CoV2 virus could inhibit the activity of lysophosphatidylcholine acyltransferase 3 (Lpcat) which is involved in phosphatidylcholine remodeling in the small intestine and liver (27). Indeed, in experimental calf pneumonia, the activity of Lpcat is reduced as early as one day after inoculation of *Pasteurella haemolytica* of bovine herpes virus-1, inducing a decrease in serum HDL concentration, and therefore of apolipoprotein-A1 its transporter, before the haptoglobin increase (12). In knock-out mice, Lpcat deficiency causes about 90% reduction of total Lpcat activity in the small intestine, whereas the deficiency only causes about a 70% reduction of total activity in the liver (27, 28). The impact of SARS-CoV2 on the small intestine could explained the decrease of serum apoA1, due to a decrease of its absorption (29). Indeed, they are evidence of direct SARS-CoV2 infection of the endothelial cell and diffuse endothelial inflammation in the intestine (30). The virus uses ACE2 receptor expressed by pneumocytes to infect the host, causing lung injury. The ACE-2 receptor is also widely expressed on endothelial cells, including intestine and liver. In the liver, SARS-CoV2 is also present (14), and the ACE-2 receptor seems to be more expressed in the cholangiocytes than in the hepatocytes (31, 32). They are so far no data on cases infected by SARS-CoV2, without severe symptoms, on the prevalence of the virus in the liver and in the intestine. From the results in NAFLD patients, apo-A1 was decreasing in the first 16 weeks of 2020, without increase of ALT or GGT, in comparison with the same weeks of 2019.

Conclusion

These results indicate that apolipoprotein-A1 can serve as a very early marker of the covid-19 pandemic in France and USA in the general population, with high specificity and sensitivity. It can also be used without delay in surveillance by dosing in routine. It could help immediately to manage patients with a clinical suspicion of covid-19 and a negative virologic test (25). The role of SARS-CoV2 in the possible "asymptomatic" decrease of apolipoprotein-A1 could be related to intestine or liver infection without or before overt pulmonary disease. Finally, apolipoprotein-A1 hundred years after surrogate sentinel HDL-cholesterol (2), which had a reasonable temporal stability, could be included as "part of the early warning systems that alert the world to potential outbreaks" (35).

Example 3. Combination of Multiple Markers

Combination of Three Markers

A function that combines the level of apolipoprotein A1 (apoA1), the age (Log) and the sex of the patient was designed. Use of these three markers in this function made it possible to obtain an AUROC of 0.962.

Combination of Five Markers

Figure 5:
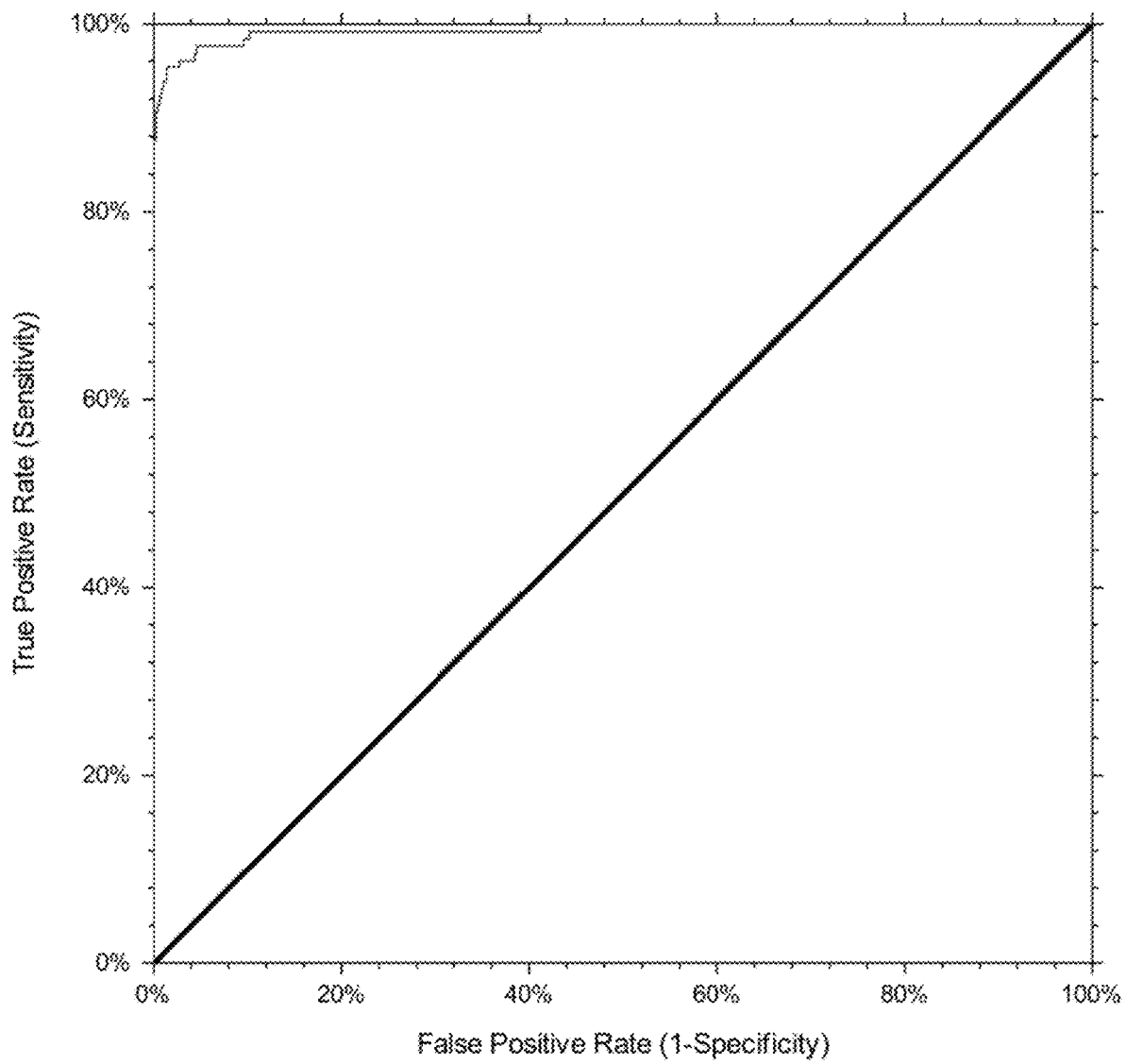
FIG. 5. Receiving Operating Curve for a function combining the level of apolipoprotein A1 (apoA1), the level of gammaglutamyl transpeptidase (GGT), the level of haptoglobin (Hapto), the age and the sex of the patient.

In another embodiment, one uses a function that combines the level of apolipoprotein A1 (apoA1), the level of gammaglutamyl transpeptidase (GGT), the level of haptoglobin (Hapto), the age and the sex of the patient. Use of these five markers in this function made it possible to obtain an AUROC of 0.994. (FIG. 5).

Combination of Six Markers

A function that combines the level of apolipoprotein A1 (apoA1), the amount of alpha-2 macroglobulin (A2M), the level of gammaglutamyl transpeptidase (GGT), the level of haptoglobin (Hapto), the age and the sex of the patient was designed. $F6=-21.12957-9.80509*ApoA1+6.14688*Log(hapto)+3.29395*Log(GGT)-0.52093*Log(A2M)+13.64505*Log(AGE)-1.15945*SEX$ (1 for male; 0 for female)

Figure 6:
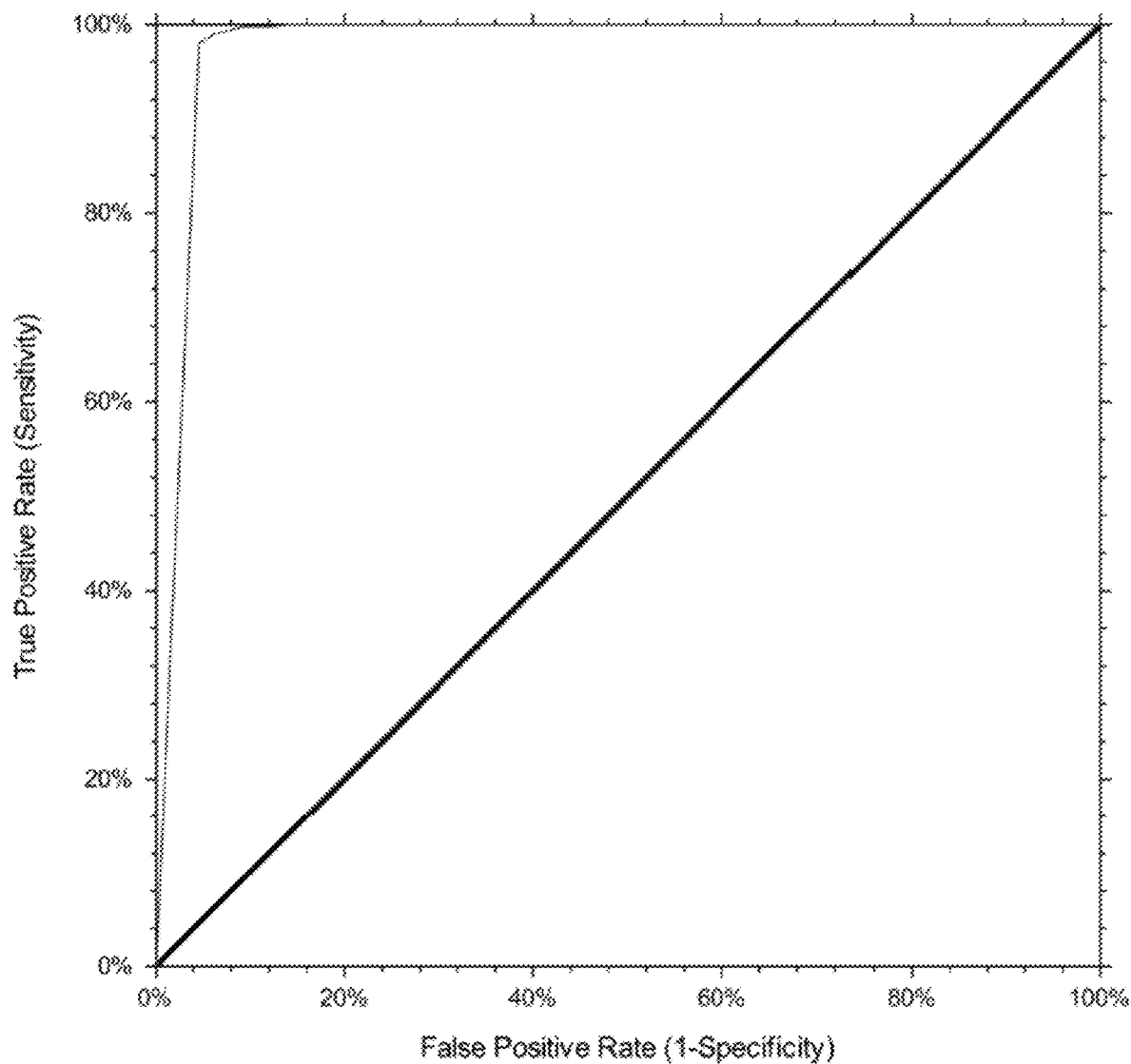
FIG. 6. Receiving Operating Curve for a function combining the level of apolipoprotein A1 (apoA1), the level of gammaglutamyl transpeptidase (GGT), the level of haptoglobin (Hapto), the level of Alpha-2-Macroglobulin (A2M) the age and the sex of the patient.

The Area Under Operating Curve (AUROC) was 0.9937 (FIG. 6).

Different thresholds were assessed.

For a cutoff at 0.5000, the function has
Sensitivity: 0.8516
Specificity: 0.9993
NPV: 0.9975
PPV: 0.9561

Such threshold gives a 0.997 accuracy (which is the proportion of correctly classified patients). In other words, only 0.3% of the patients are incorrectly classified (either as false positive or false negative).

For a cutoff at 0.3000, the sensitivity increases, but the specificity decreases.
Sensitivity: 0.8984
Specificity: 0.9985
NPV: 0.9983
PPV: 0.9127

The positive predictive value decreases, thus increasing the risk of false positive. The accuracy for this cut-off would be similar to the one for 0.500 cutoff.

For a cutoff at 0.7000, the sensitivity decreases, but the specificity increases.
Sensitivity: 0.7734
Specificity: 0.9996
NPV: 0.9961
PPV: 0.9706

The accuracy for this cut-off would be similar to the one for 0.500 cutoff.

The PPV and NPV values have been calculated with a prevalence of the disease of 1.7%, in the population, which is likely lower than the actual prevalence (which is estimated to be around 4-10%).

With a 7% prevalence, using the 0.5000 cutoff, the PPV would be 0.9897 and the NPV would be 0.9889.

REFERENCES

1. Wynants L, Van Calster B, Bonten M M J, et al. Prediction models for diagnosis and prognosis of covid-19 infection: systematic review and critical appraisal. BMJ 2020; 369: m1328.
2. Kipp H A. Variation in the cholesterol content of the serum in pneumonia. J Biol Chem 1920; 44:215-237.
3. Liu S H, Liang H Y, Li H Y, et al. Effect of low high-density lipoprotein levels on mortality of septic patients: A systematic review and meta-analysis of cohort studies. World J Emerg Med 2020; 11:109-116.
4. Delanghe J R, Langlois M R, Boelaert J R, et al. J. Plum. Haptoglobin polymorphism, iron metabolism and mortality in HIV infection. AIDS 1998; 12:1027-32.
5. Yang H, Wang H, Wang Y, et al. The haptoglobin beta subunit sequesters HMGB1 toxicity in sterile and infectious inflammation. J Intern Med 2017; 282:76-93.
6. Imbert-Bismut F, Ratziu V, Pieroni L, et al. Biochemical markers of liver fibrosis in patients with hepatitis C virus infection: a prospective study. Lancet 2001; 357:1069-75.
7. Poynard T, Lebray P, Ingiliz P, et al. Prevalence of liver fibrosis and risk factors in a general population using non-invasive biomarkers (FibroTest). BMC Gastroenterol 2010; 10:40.
8. Poynard T, Deckmyn O, Munteanu M, et al. Awareness of the severity of liver disease re-examined using software-combined biomarkers of liver fibrosis and necroinflammatory activity. BMJ open 2015; 5:e010017.
9. Poynard T, Munteanu M, Charlotte F, et al. Diagnostic performance of a new noninvasive test for nonalcoholic steatohepatitis using a simplified histological reference. Eur J Gastroenterol Hepatol 2018; 30: 569-577.

10. Poynard T, Munteanu M, Deckmyn O, et al. Applicability and precautions of use of liver injury biomarker FT. A reappraisal at 7 years of age. BMC Gastroenterol 2011; 11:39.
11. Poljak M, Korva M, Knap Gašper N, et al. Clinical evaluation of the Cobas SARS-CoV-2 test and a diagnostic platform switch during 48 hours in the midst of the COVID-19 pandemic. J Clin Microbiol 2020; pii: JCM.00599-20.
12. Nakagawa H, Katoh N. Reduced serum lecithin:cholesterol acyltransferase activity and cholesteryl ester concentration in calves experimentally inoculated with *Pasteurella haemolytica* and bovine herpes virus-1. J Vet Med Sci 1999; 6:1101-1106.
13. Zhang C, Shi L, Wang F S. Liver injury in COVID-19: management and challenges. Lancet Gastroenterol Hepatol 2020; 5: 428-430.
14. Zhou P, Yang X L, Wang X G, et al. A pneumonia outbreak associated with a new coronavirus of probable bat origin. Nature. 2020; 579:270-273.
15. Kelly B J, Lautenbach E, Nachamkin I, et al. Combined biomarkers predict acute mortality among critically ill patients with suspected sepsis. Crit Care Med 2018; 46:1106-1113.
16. Chen N, Zhou M, Dong X, et al. Epidemiological and clinical characteristics of 99 cases of 2019 novel coronavirus pneumonia in Wuhan, China: a descriptive study. Lancet 2020; 395:507-513.
17. Poynard T, Abella A, Pignon J P, et al. Apolipoprotein A1 and alcoholic liver disease. Hepatology 1986; 6:1391-1395.
18. Church R J, Kullak-Ublick G A, Aubrecht J, et al. Candidate biomarkers for the diagnosis and prognosis of drug-induced liver injury: An international collaborative effort. Hepatology 2019; 69:760-773.
19. Peta V, Tse C, Perazzo H, et al. Serum apolipoprotein A1 and haptoglobin, in patients with suspected drug-induced liver injury (DILI) as biomarkers of recovery. PloS One 2017; 12:e0189436.
20. Rudler M, Mouri S, Charlotte F, et al. Validation of AshTest as a non-invasive alternative to transjugular liver biopsy in patients with suspected severe acute alcoholic hepatitis. PLoS One 2015; 10:e0134302.
21. Bedossa P, Poynard T, Abella A, et al. Apolipoprotein AI is a serum and tissue marker of liver fibrosis in alcoholic patients. Alcohol Clin Exp Res. 1989; 13:829-833.
22. Perazzo H, Pais R, Munteanu M, et al. Variability in definitions of transaminase upper limit of the normal impacts the APRI performance as a biomarker of fibrosis in patients with chronic hepatitis C: "APRI c'est fini?". Clin Res Hepatol Gastroenterol. 2014; 38:432-439.
23. Deslandes A, Berti V, Tandjaoui-Lambotte Y, et al. SARS-COV-2 was already spreading in France in late December 2019. International Journal of Antimicrobial Agents 2020; 3:106006.
24. Holshue M L, DeBolt C, Lindquist S, et al. First Case of 2019 novel coronavirus in the United States. N Engl J Med. 2020; 382:929-936.
25. Li Y, Yao L, Li J, et al. Stability issues of RT-PCR testing of SARS-CoV-2 for hospitalized patients clinically diagnosed with COVID-19. Journal of medical virology 2020; doi: 10.1002/jmv.25786.
26. Salje H, Tran Kiem C, Lefrancq N, et al. Estimating the burden of SARS-CoV-2 in France. Science 2020; pii: eabc3517.
27. Kabir I, Li Z, Bui H H, Kuo M S, Gao G, Jiang X C. Small Intestine but Not Liver Lysophosphatidylcholine Acyltransferase 3 (Lpcat3) Deficiency Has a Dominant Effect on Plasma Lipid Metabolism. *J Biol Chem.* 2016; 291(14):7651-7660.
28. Li, Z., Jiang, H., Ding, T., Lou, C., Bui, H. H., Kuo, M. S., and Jiang, X. C. (2015) Deficiency in lysophosphatidylcholine acyltransferase 3 reduces plasma levels of lipids by reducing lipid absorption in mice. Gastroenterology 149, 1519-1529
29. Glickman, R. M., and Green, P. H. (1977) The intestine as a source of apolipoprotein A1. Proc. Natl. Acad. Sci. U.S.A. 74, 2569-2573
30. Gu J, Han B, Wang J. COVID-19: Gastrointestinal Manifestations and Potential Fecal-Oral Transmission. *Gastroenterology.* 2020; 158(6):1518-1519. doi:10.1053/j.gastro.2020.02.054
31. Xu H, Zhong L, Deng J, et al. High expression of ACE2 receptor of 2019-nCoV on the epithelial cells of oral mucosa. *Int J Oral Sci.* 2020; 12(1):8. Published 2020 Feb. 24.
32. Zhang H, Kang Z J, Gong H Y, et al. The digestive system is a potential route of 2019-nCov infection: a bioinformatics analysis based on single-cell transcriptomes. Preprint. Posted online Jan. 30, 2020. bioRxiv 927806. doi: 10.1101/2020.01.30.927806
33. Chai X Q, Hu L F, Zhang Y, et al. Specific ACE2 Expression in Cholangiocytes May Cause Liver Damage After 2019-nCoV Infection. Preprint. Posted online Feb. 3, 2020. bioRxiv 931766. doi: 10.1101/2020.02.03.931766
34. Epstein M M, Breen E C, Magpantay L, et al. Temporal stability of serum concentrations of cytokines and soluble receptors measured across two years in low-risk HIV-seronegative men. Cancer Epidemiol Biomarkers Prev. 2013; 22(11):2009-2015.
35. Gates B. Responding to covid-19—A Once-in-a-Century Pandemic? New Engl J Med 2020; 382:1677-1679.

The invention claimed is:
1. An in vitro method for detecting whether a patient is infected with Severe Acute Respiratory Syndrome Coronavirus 2 (SARS-COV-2) virus, comprising:
   a) determining an amount of apolipoprotein A1 (apoA1) in a serum sample from the patient and additionally assessing other clinical markers of the patient to obtain values, wherein
   measurement of the amount of apoAI is performed by at least one of the following methods: ELISA, colorimetric assay, or Lateral Flow Assay, and
   the other clinical markers are an amount of gammaglutamyl transpeptidase (GGT), an amount of haptoglobin (Hapto), an amount of a2-macroglobulin (A2M), age of the patient, and sex of the patient;
   b) combining the amount of apoA1 and the values obtained in a) through a function and calculating an end value, wherein the function is $F6 = a0 + a1*ApoA1 (g/L) + a2*Log (hapto (g/L)) + a3 Log (*GGT (IU/L)) + a4*Log (A2M (g/L)) + a5*Log (AGE (years)) + a6*SEX$ (0 for women, 1 for men), with
   i) $-23 \leq a0 \leq -19$,
   ii) $-11.2 \leq a1 \leq -8.4$,
   iii) $4.5 \leq a2 \leq 7.7$,
   iv) $2.3 \leq a3 \leq 4.2$,
   v) $-0.75 \leq a4 \leq -0.25$,
   vi) $11.5 \leq a5 \leq 15.5$, and
   vii) $-1.8 \leq a6 \leq -0.5$; and c) comparing the end value calculated in b) to a predetermined threshold, wherein the patient is infected with the SARS-Cov-2 if the end value calculated in b) is higher than the threshold.

2. The method of claim 1, wherein the function is F6=−21.12957−9.80509*ApoA1+6.14688*Log (hapto)+3.29395*Log (GGT)−0.52093*Log (A2M)+13.64505*Log (AGE)−1.15945*SEX (0 for women, 1 for men).

3. An in vitro method for detecting whether a patient is infected with Severe Acute Respiratory Syndrome Coronavirus 2 (SARS-COV-2), comprising:

a) determining an amount of apolipoprotein A1 (apoA1) in a serum sample from the patient and additionally assessing other clinical markers of the patient to obtain values, wherein measurement of the amount of apoAI is performed by at least one of the following methods: ELISA, colorimetric assay, or Lateral Flow Assay, and the other clinical markers are an amount of haptoglobin (Hapto), age of the patient, and sex of the patient;

b) combining the amount of apoA1 and the values obtained in a) through a function and calculating an end value, wherein the function is F7=b0+b1*ApoA1 (g/L)+b2*Log (hapto (g/L))+b3*AGE (years)+b4*SEX (0 for women, 1 for men), with i) 3≤b0≤4,
ii) −11.8≤b1≤−9.8,
iii) 4≤b2≤6,
iv) 0.05≤b3≤0.15, and
v) −1.15≤b4≤−0.85; and c) comparing the end value calculated in b) to a predetermined threshold, wherein the patient is infected with the SARS-Cov-2 if the end value calculated in b) is higher than the threshold.

4. A method for treating a patient within with COVID-19, comprising detecting whether a patient is infected with the SARS-COV-2 virus according to the method of claim 1 and administering one or more of hydroxychloroquine, azithromycin, remdesivir, lopinavir, ritonavir, anti IL6 or anti IL6 receptor antibody, and tocilizumab if the patient is infected with the SARS-Cov-2 virus, wherein the patient is infected with the SARS-Cov-2 virus if the end value is higher than 0.5000.

5. A method for treating a patient within with COVID-19, comprising detecting whether a patient is infected with the SARS-COV-2 virus according to the method of claim 3 and administering one or more of hydroxychloroquine, azithromycin, remdesivir, lopinavir, ritonavir, anti IL6 or anti IL6 receptor antibody, and tocilizumab if the patient is infected with the SARS-Cov-2 virus, wherein the patient is infected with the SARS-Cov-2 virus if the end value is higher than 0.0096.

* * * * *